US006678825B1

(12) United States Patent
Ellison et al.

(10) Patent No.: US 6,678,825 B1
(45) Date of Patent: Jan. 13, 2004

(54) CONTROLLING ACCESS TO MULTIPLE ISOLATED MEMORIES IN AN ISOLATED EXECUTION ENVIRONMENT

(75) Inventors: Carl M. Ellison, Portland, OR (US); Roger A. Golliver, Beaverton, OR (US); Howard C. Herbert, Phoenix, AZ (US); Derrick C. Lin, San Mateo, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 496 days.

(21) Appl. No.: 09/618,738

(22) Filed: Jul. 18, 2000

Related U.S. Application Data

(60) Provisional application No. 60/198,226, filed on Mar. 31, 2000.

(51) Int. Cl.⁷ .............................................. G06F 17/60
(52) U.S. Cl. ..................... 713/200; 711/152; 711/163; 710/200
(58) Field of Search .................... 713/200; 711/152, 711/156, 163; 710/108, 200, 240

(56) References Cited

U.S. PATENT DOCUMENTS

| 4,037,214 A | 7/1977 | Birney |
| 4,278,837 A | 7/1981 | Best |
| 4,366,537 A | 12/1982 | Heller et al. |

(List continued on next page.)

FOREIGN PATENT DOCUMENTS

| EP | 0 600 112 A1 | 11/1992 |
| EP | 0930567 A3 | 4/2000 |

(List continued on next page.)

OTHER PUBLICATIONS

Goldberg, R., "Survey of virtual machine research," IEEE Computer Magazine 7(6), pp. 34–45, 1974.
Gum, P.H., "System/370 Extended Architecture: Facilities for Virtual Machines," IBM J. Research Development, Vol 27, No. 6, pp. 530–544, Nov. 1983.

(List continued on next page.)

Primary Examiner—John W. Hayes
(74) Attorney, Agent, or Firm—Blakley, Sokoloff, Taylor & Zafman LLP

(57) ABSTRACT

The present invention provides a method, apparatus, and system for controlling memory accesses to multiple isolated memory areas in an isolated execution environment. A page manager is used to distribute a plurality of pages to a plurality of different areas of a memory, respectively. The memory is divided into non-isolated areas and isolated areas. The page manager is located in an isolated area of memory. Further, a memory ownership page table describes each page of memory and is also located in an isolated area of memory. The page manager assigns an isolated attribute to a page if the page is distributed to an isolated area of memory. On the other hand, the page manager assigns a non-isolated attribute to a page if the page is distributed to a non-isolated area of memory. The memory ownership page table records the attribute for each page. In one embodiment, a processor having a normal execution mode and an isolated execution mode generates an access transaction. The access transaction is configured using a configuration storage that contains configuration settings related to a page and access information. An access checking circuit coupled to the configuration storage checks the access transaction using at least one of the configuration settings and the access information and generates an access grant signal if the access transaction is valid.

40 Claims, 14 Drawing Sheets

U.S. PATENT DOCUMENTS

| | | | |
|---|---|---|---|
| 4,521,852 A | | 6/1985 | Guttag |
| 4,571,672 A | | 2/1986 | Hatada et al. |
| 5,022,077 A | | 6/1991 | Bealkowski et al. |
| 5,075,842 A | | 12/1991 | Lai |
| 5,079,737 A | | 1/1992 | Hackbarth |
| 5,255,379 A | | 10/1993 | Melo |
| 5,293,424 A | | 3/1994 | Holtey et al. |
| 5,386,552 A | | 1/1995 | Garney |
| 5,421,006 A | | 5/1995 | Jablon et al. |
| 5,455,909 A | | 10/1995 | Blomgren et al. |
| 5,459,869 A | | 10/1995 | Spilo |
| 5,473,692 A | | 12/1995 | Davis |
| 5,479,509 A | | 12/1995 | Ugon |
| 5,568,552 A | | 10/1996 | Davis |
| 5,615,263 A | | 3/1997 | Takahashi |
| 5,628,022 A | | 5/1997 | Ueno et al. |
| 5,657,445 A | | 8/1997 | Pearce |
| 5,717,903 A | | 2/1998 | Bonola |
| 5,729,760 A | * | 3/1998 | Poisner ........................ 395/823 |
| 5,737,760 A | | 4/1998 | Grimmer, Jr. et al. |
| 5,757,919 A | * | 5/1998 | Herbert et al. ................ 380/25 |
| 5,764,969 A | | 6/1998 | Kahle et al. |
| 5,796,845 A | | 8/1998 | Serikawa et al. |
| 5,805,712 A | | 9/1998 | Davis |
| 5,835,594 A | | 11/1998 | Albrecht et al. |
| 5,844,986 A | | 12/1998 | Davis |
| 5,852,717 A | | 12/1998 | Bhide |
| 5,872,994 A | | 2/1999 | Akiyama et al. |
| 5,890,189 A | | 3/1999 | Nozue et al. |
| 5,937,063 A | | 8/1999 | Davis |
| 5,953,502 A | | 9/1999 | Helbig, Sr. |
| 5,978,481 A | | 11/1999 | Ganesan et al. |
| 5,987,557 A | | 11/1999 | Ebrahim |
| 6,014,745 A | | 1/2000 | Ashe |
| 6,055,637 A | | 4/2000 | Hudson et al. |
| 6,058,478 A | | 5/2000 | Davis |
| 6,085,296 A | * | 7/2000 | Karkhanis et al. .......... 711/147 |
| 6,101,584 A | | 8/2000 | Satou et al. |
| 6,125,430 A | * | 9/2000 | Noel et al. ................... 711/152 |
| 6,148,379 A | * | 11/2000 | Schimmel ................... 711/152 |
| 6,158,546 A | | 12/2000 | Hanson et al. |
| 6,175,925 B1 | | 1/2001 | Nardone et al. |
| 6,178,509 B1 | | 1/2001 | Nardone et al. |
| 6,192,455 B1 | | 2/2001 | Bogin et al. |
| 6,205,550 B1 | | 3/2001 | Nardone et al. |
| 6,249,872 B1 | | 6/2001 | Wildgrube et al. |
| 6,272,533 B1 | | 8/2001 | Browne |
| 6,282,651 B1 | | 8/2001 | Ashe |
| 6,282,657 B1 | | 8/2001 | Kaplan et al. |
| 6,292,874 B1 | | 9/2001 | Barnett |
| 6,301,646 B1 | * | 10/2001 | Hostetter .................... 711/206 |
| 6,321,314 B1 | * | 11/2001 | Van Dyke ................... 711/163 |
| 6,339,816 B1 | * | 1/2002 | Bausch ....................... 711/163 |
| 2001/0021969 A1 | * | 9/2001 | Burger et al. ................ 711/207 |
| 2001/0027527 A1 | | 10/2001 | Balashov et al. |
| 2001/0037450 A1 | | 11/2001 | Metlitski et al. |

FOREIGN PATENT DOCUMENTS

| | | |
|---|---|---|
| EP | 1 030 237 A | 8/2000 |
| EP | 1146715 | 10/2001 |
| WO | WO 97/29567 | 8/1997 |
| WO | WO 98/34365 | 8/1998 |
| WO | WO9844402 | 10/1998 |
| WO | WO9905600 | 2/1999 |
| WO | W0 99 09482 A | 2/1999 |
| WO | WO9957863 | 11/1999 |
| WO | WO0062232 | 10/2000 |
| WO | WO 01/27723 A | 4/2001 |
| WO | WO 01/27821 A | 4/2001 |
| WO | WO 01/75565 | 10/2001 |
| WO | W0 01 75565 A2 | 10/2001 |
| WO | WO 01/75595 | 10/2001 |
| WO | WO 01/75595 A2 | 10/2001 |

OTHER PUBLICATIONS

Rosenblum, M. "Vmware's Virtual Platform: A Virtual Machine Monitor for Commodity PCs," Proceedings of the 11th Hotchips Conference, pp. 185–196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1–31.

J. Heinrich, MIPS R4000 Microprocessor User's Manual, Apr. 1, 1993, p. 61–97.

"M68040 User's Manual", Motorola Inc., pp. 1–5–pp. 1–9, pp. 1–13–pp. 1–20, pp. 2–1–pp. 2–3, pp. 4–1, pp. 8–9–pp. 8–11.

"Intel 386 DX Microprocessor 32–Bit CHMOS Microprocessor with Integrated Memory Management", Dec. 31, 1995, Intel Inc., pp. 32–56; figure 4–14.

Joe Heinrich:"MIPS R4000 Microprocessor User's Manual", 1994, MIPS Technology, Inc., Mountain View, CA, pp. 67–79.

Berg C: "How Do I Creat A Signed Apple?", Dr. Dobb's Journal, M&T Publ., Redwood City, CA, US, vol. 22, No. 8, 8 '97, pp. 109–111, 122.

Gong L et al: "Going Beyond The Sandbox: An Overview of the New Security Architecture In The Java Development Kit 1.2", Proceedings of The Usenix Symposium on Internet Technologies and Systems, Montery, CA 12 '97, pp. 103–112.

* cited by examiner

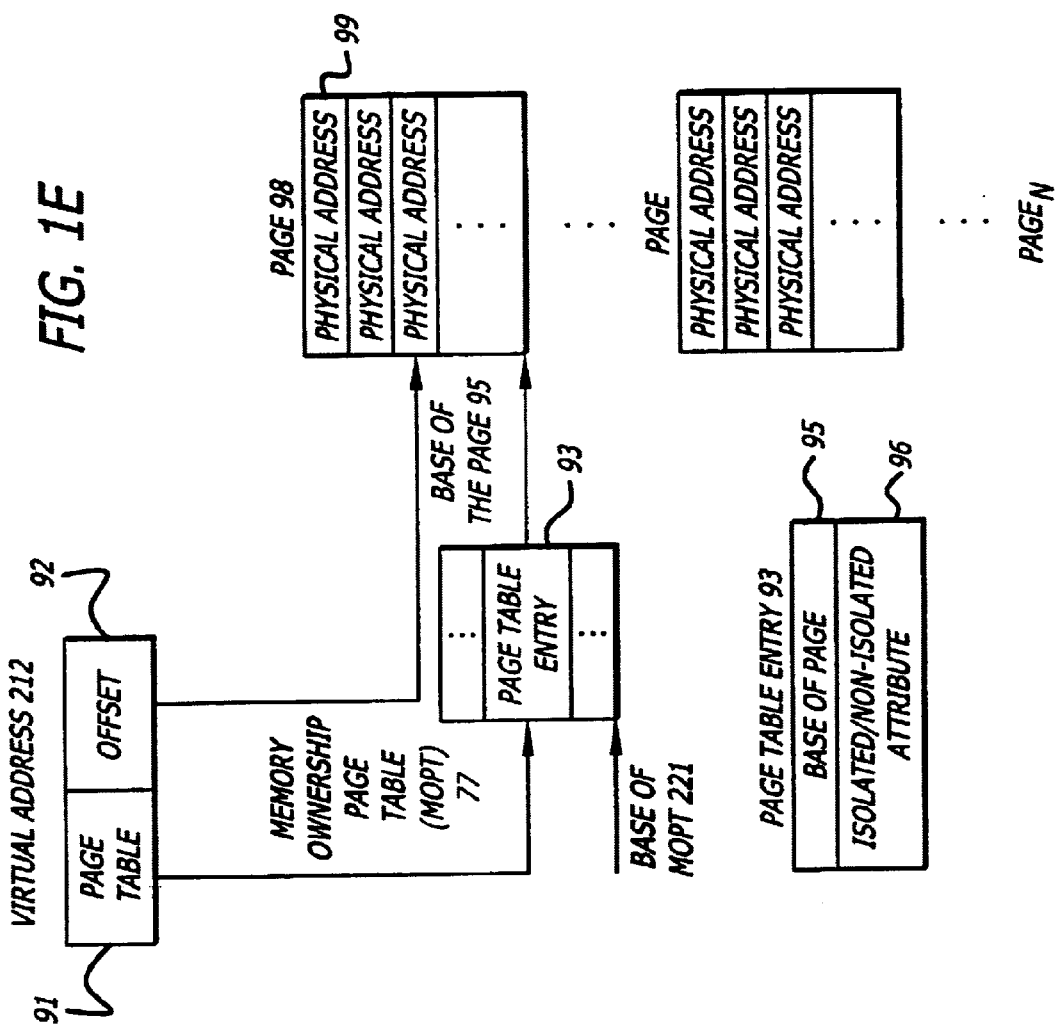

CONTROLLING ACCESS TO MULTIPLE ISOLATED MEMORIES IN AN ISOLATED EXECUTION ENVIRONMENT

RELATED APPLICATION

This application claims the benefit U.S. Provisional Patent Application No. 60/198,226 filed on Mar. 31, 2000.

BACKGROUND

1. Field of the Invention

This invention relates to microprocessors. In particular, the invention relates to processor security.

2. Description of Related Art

Advances in microprocessor and communication technologies have opened up many opportunities for applications that go beyond the traditional ways of doing business. Electronic commerce (E-commerce) and business-to-business (B2B) transactions are now becoming popular and are conducted throughout global markets at continuously increasing rates. Unfortunately, while modern microprocessor systems provide users convenient and efficient methods of doing business, communicating and transacting, they are also vulnerable for unscrupulous attacks. Examples of these attacks include virus, intrusion, security breach, and tampering, to name a few. Computer security, therefore, is becoming more and more important to protect the integrity of the computer systems and increase the trust of users.

Threats caused by unscrupulous attacks may be in a number of forms. An invasive remote-launched attack by hackers may disrupt the normal operation of a system connected to thousands or even millions of users. A virus program may corrupt code and/or data of a single-user platform.

Existing techniques to protect against attacks have a number of drawbacks. Anti-virus programs can only scan and detect known viruses. Security co-processors or smart cards using cryptographic or other security techniques have limitations in speed performance, memory capacity, and flexibility. Further, redesigning operating systems creates software compatibility issues and requires tremendous investment in development efforts.

BRIEF DESCRIPTION OF THE DRAWINGS

The features and advantages of the present invention will become apparent from he following detailed description of the present invention in which:

FIG. 1E is a diagram illustrating a memory ownership page table and a process of converting a virtual address to a physical address according to one embodiment of the invention.

DESCRIPTION

Figure 1A:
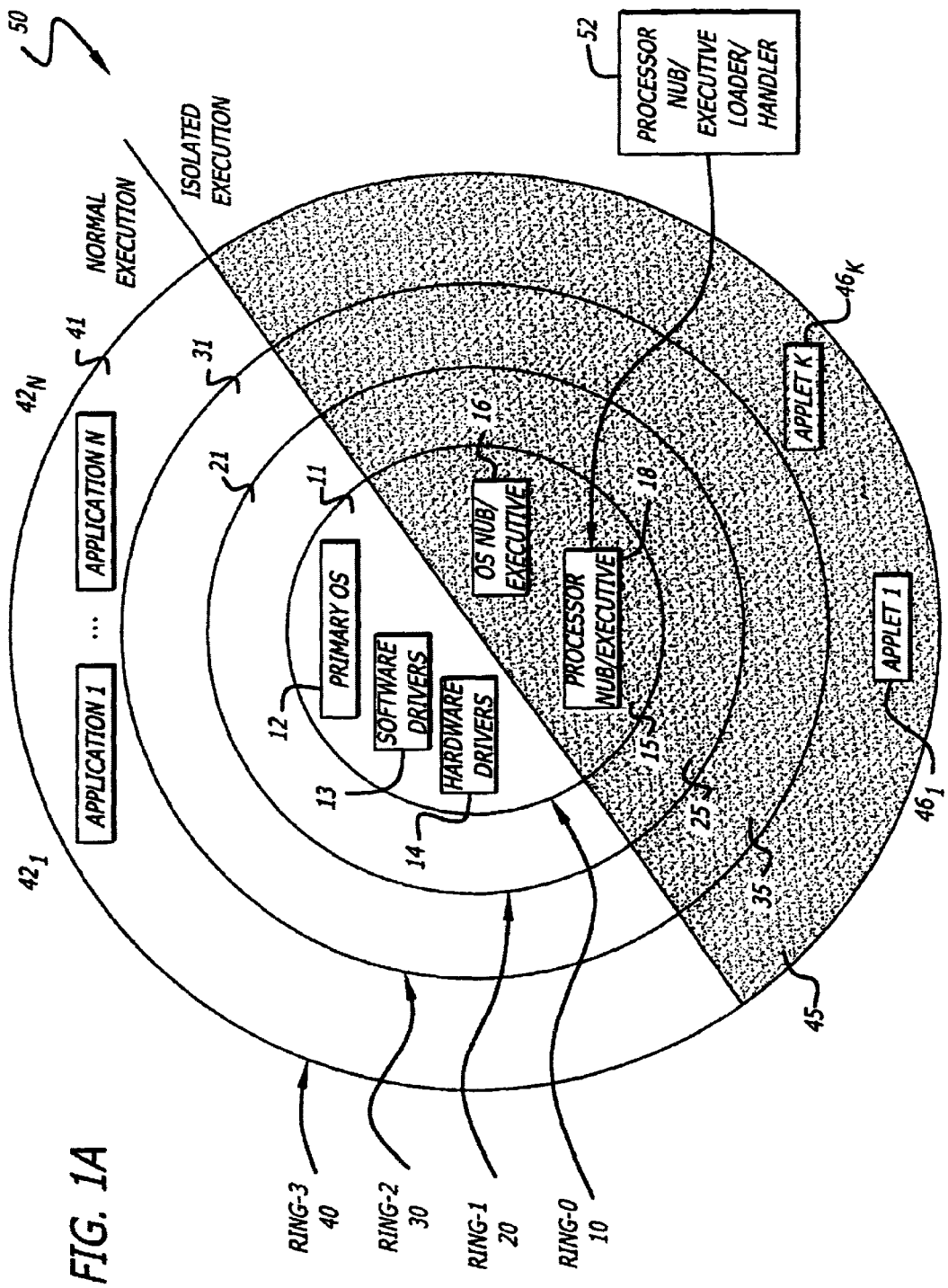
FIG. 1A is a diagram illustrating an operating system according to one embodiment of the invention.

The present invention is a method, apparatus and system to control memory accesses to multiple isolated memories in an isolated execution environment. A page manager is used to distribute a plurality of pages to a plurality of different areas of a memory, respectively. The memory is divided into non-isolated areas and isolated areas. The page manager is located in an isolated area of memory. Further, a memory ownership page table describes each page of memory and is also located in an isolated area of memory. The page manager assigns an isolated attribute to a page if the page is distributed to an isolated area of memory. On the other hand, the page manager assigns a non-isolated attribute to a page if the page is distributed to a non-isolated area of memory. The memory ownership page table records the attribute for each page.

In one embodiment, a processor having a normal execution mode and an isolated execution mode generates an access transaction. The access transaction is configured using a configuration storage that contains configuration settings. The access transaction includes access information such as a physical address of the memory to be accessed. The configuration settings provide information related to a page of memory involved in the access transaction. The configuration settings include an attribute for the page that defines the page as isolated or non-isolated and an execution mode word that is asserted when the processor is configured in an isolated execution mode. In one embodiment, the execution mode word is a single bit indicating if the processor is in the isolated execution mode. An access checking circuit coupled to the configuration storage checks the access transaction using at least one of the configuration settings and the access information.

In one embodiment, the access checking circuit includes a TLB access checking circuit. The TLB access checking circuit generates an access grant signal if the access transaction is valid. Particularly, if the attribute for the page is set to isolated and the execution mode word signal is asserted, the TLB access checking circuit generates an access grant signal to the isolated area of memory. Thus, when a processor requests a physical address of an isolated area of memory, only if the processor is operating in the isolated execution mode and the attribute for the page associated with the physical address is set to isolated, will the access transaction be granted.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

ARCHITECTURE OVERVIEW

One principle for providing security in a computer system or platform is the concept of an isolated execution architecture. The isolated execution architecture includes logical and physical definitions of hardware and software components that interact directly or indirectly with an operating system of the computer system or platform. An operating system and the processor may have several levels of hierarchy, referred to as rings, corresponding to various operational modes. A ring is a logical division of hardware and software components that are designed to perform dedicated tasks within the operating system. The division is typically based on the degree or level of privilege, namely, the ability to make changes to the platform. For example, a ring-0 is the innermost ring, being at the highest level of the hierarchy. Ring-0 encompasses the most critical, privileged components. In addition, modules in Ring-0 can also access lesser privileged data, but not vice versa. Ring-3 is the outermost ring, being at the lowest level of the hierarchy. Ring-3 typically encompasses users or applications level and has the least privilege. Ring-1 and ring-2 represent the intermediate rings with decreasing levels of security and/or protection.

FIG. 1A is a diagram illustrating a logical operating architecture 50 according to one embodiment of the invention. The logical operating architecture 50 is an abstraction of the components of an operating system and the processor. The logical operating architecture 50 includes ring-0 10, ring-1 20, ring-2 30, ring-3 40, and a processor nub loader 52. The processor nub loader 52 is an instance of an processor executive (PE) handler. The PE handler is used to handle and/or manage a processor executive (PE) as will be discussed later. The logical operating architecture 50 has two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system, usually referred to as kernel. These software modules include primary operating system (e.g., kernel) 12, software drivers 13, and hardware drivers 14. The isolated execution Ring-0 15 includes an operating system (OS) nub 16 and a processor nub 18. The OS nub 16 and the processor nub 18 are instances of an OS executive (OSE) and processor executive (PE), respectively. The OSE and the PE are part of executive entities that operate in a protected environment associated with an isolated area and the isolated execution mode. The processor nub loader 52 is a protected bootstrap loader code held within a chipset in the system and is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$ to $42_N$ and isolated execution ring-3 includes K applets $46_1$ to $46_K$.

One concept of the isolated execution architecture is the creation of an isolated region in the system memory, referred to as an isolated area, which is protected by both the processor and chipset in the computer system. The isolated region may also be in cache memory, protected by a translation look aside buffer (TLB) access check. Also, the isolated region may be subdivided into multiple isolated memory areas, as will be discussed. Access to this isolated region is permitted only from a front side bus (FSB) of the processor, using special bus (e.g., memory read and write) cycles, referred to as isolated read and write cycles. The special bus cycles are also used for snooping. The isolated read and write cycles are issued by the processor executing in an isolated execution mode. The isolated execution mode is initialized using a privileged instruction in the processor, combined with the processor nub loader 52. The processor nub loader 52 verifies and loads a ring-0 nub software module (e.g., processor nub 18) into the isolated area. The processor nub 18 provides hardware-related services for the isolated execution.

One task of the processor nub 18 is to verify and load the ring-0 OS nub 16 into the isolated area, and to generate the root of a key hierarchy unique to a combination of the platform, the processor nub 18, and the operating system nub 16. The processor nub 18 provides the initial set-up and low-level management of the isolated area including verification, loading, and logging of the operating system nub 16, and the management of a symmetric key used to protect the operating system nub's secrets. The processor nub 18 may also provide application programming interface (API) abstractions to low-level security services provided by other hardware.

The operating system nub 16 provides links to services in the primary OS 12 (e.g., the unprotected segments of the operating system), provides page management within the isolated area, and has the responsibility for loading ring-3 application modules 45, including applets $46_1$ to $46_K$, into protected pages allocated in the isolated area. The operating system nub 16 may also load ring-0 supporting modules. As will be discussed, the primary OS 12 manages pages that are outside of the isolated area.

The operating system nub 16 may choose to support paging of data between the isolated area and ordinary (e.g., non-isolated) memory. If so, then the operating system nub 16 is also responsible for encrypting and hashing the isolated area pages before evicting the page to the ordinary memory, and for checking the page contents upon restoration of the page. The isolated mode applets $46_1$ to $46_K$ and their data are tamper-resistant and monitor-resistant from all software attacks from other applets, as well as from non-isolated-space applications (e.g., $42_1$ to $42_N$), dynamic link libraries (DLLs), drivers and even the primary operating system 12. Only the processor nub 18 or the operating system nub 16 can interfere with or monitor the applet's execution.

Figure 1B:
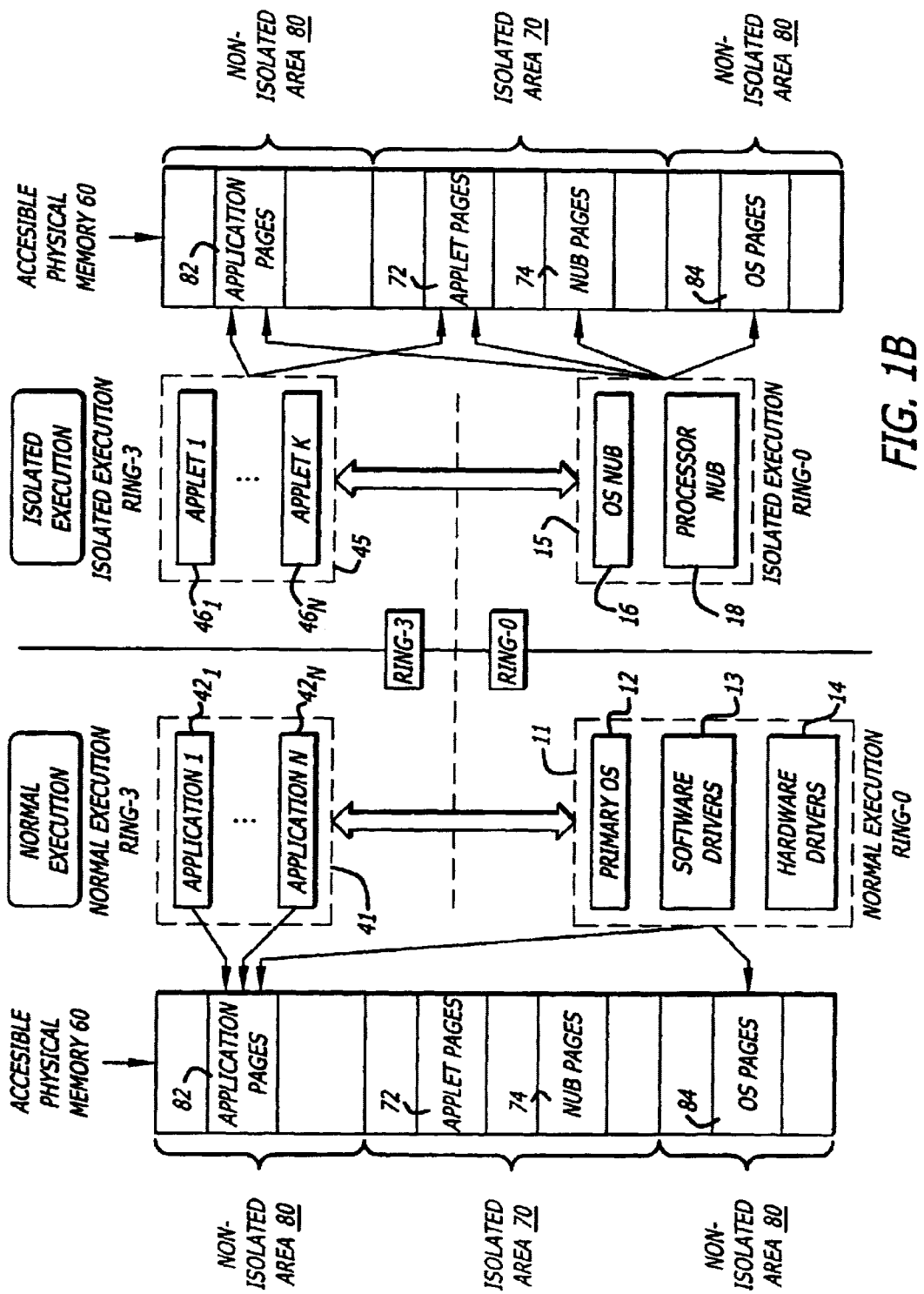
FIG. 1B is a diagram illustrating the accessibility of various elements in the operating system and the processor and a single contiguous isolated memory area according to one embodiment of the invention.

FIG. 1B is a diagram illustrating accessibility of various elements in the operating system 10 and the processor according to one embodiment of the invention. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to elements of the operating system and processor operating in isolated execution mode. The non-isolated area 80 is accessible to all elements of the ring-0 operating system and processor.

The normal execution ring-0 11 including the primary OS 12, the software drivers 13, and the hardware drivers 14, can access both the OS pages 84 and the application pages 82. The normal execution ring-3, including applications $42_1$ to $42_N$, can access only to the application pages 82. Both the normal execution ring-0 11 and ring-3 41, however, cannot access the isolated area 70.

The isolated execution ring-0 15, including the OS nub 16 and the processor nub 18, can access both the isolated area 70, including the applet pages 72 and the nub pages 74, and the non-isolated area 80, including the application pages 82 and the OS pages 84. The isolated execution ring-3 45, including applets $46_1$ to $46_K$, can access only to the application pages 82 and the applet pages 72. The applets $46_1$ to $46_K$ reside in the isolated area 70.

Figure 1C:
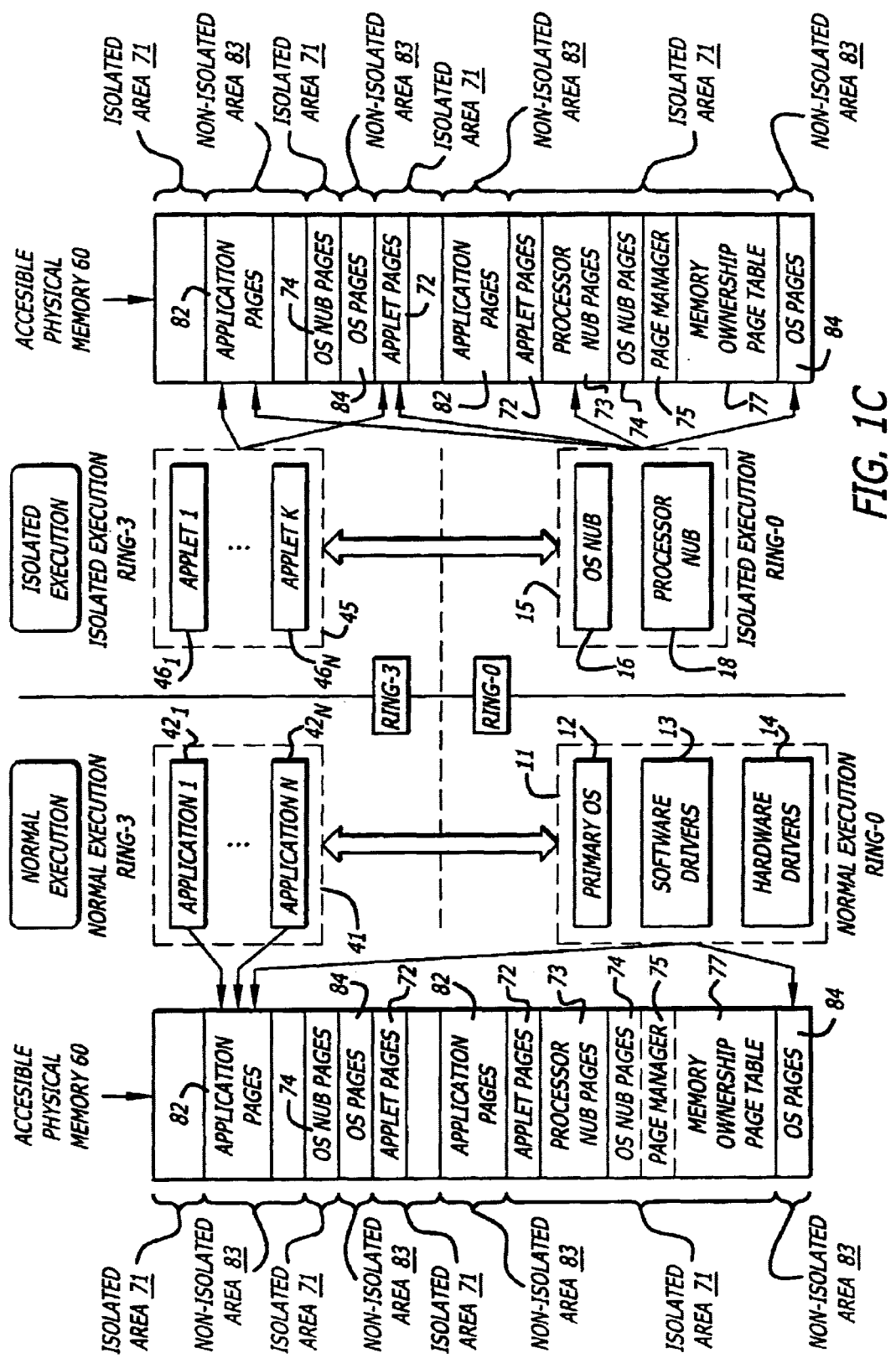
FIG. 1C is a diagram, similar to FIG. 1B, illustrating the accessibility of various elements in the operating system and the processor, and particularly, multiple isolated memory areas and multiple non-isolated memory areas, according to one embodiment of the invention.

FIG. 1C is a diagram, similar to FIG. 1B, illustrating the accessibility of various elements in the operating system and the processor, in which, the isolated memory area 70 is divided into multiple isolated memory areas 71 and the non-isolated memory area 80 is divided into multiple non-isolated memory areas 83, according to one embodiment of the invention. For illustration purposes, only elements of ring-0 10 and ring-3 40 are shown. The various elements in the logical operating architecture 50 access an accessible physical memory 60 according to their ring hierarchy and the execution mode. The accessible physical memory 60 includes the multiple isolated areas 71 and the multiple non-isolated areas 83.

The multiple isolated areas 71 include applet pages 72 and operating system (OS) nub pages 74. One of the multiple isolated areas 71 also includes the processor nub 18 (i.e. the processor executive (PE)), embodied in processor nub pages 73. The multiple non-isolated areas 83 include application pages 82 and operating system (OS) pages 84. The multiple isolated areas 71 are accessible only to elements of the operating system and processor operating in isolated execution mode. The non-isolated areas 83 are accessible to all elements of the ring-0 operating system and processor.

In this embodiment shown in FIG. 1C, the isolated memory area 70 is divided up into a plurality of multiple isolated memory areas 71 allowing for increased platform functionality in using isolated memory, as opposed to the single block of isolated memory area 70 shown in FIG. 1B. To support the multiple isolated memory areas 71, the OS nub 16 (i.e. the OS executive (OSE)), embodied in OS nub pages 74, contains a page manager 75 and a memory ownership page table 77. The OS nub controls the page manager 75. The page manager 75 is responsible for distributing pages to multiple isolated memory areas 71, such as OS nub pages 74 and applet pages 72, and to the nonisolated memory areas 83, such as OS pages 84 and application pages 82. The page manager 75 also manages and maintains the memory ownership page table 77. As will be discussed later, the memory ownership page table 77 describes each page and is used to help configure access transactions by a processor and further to verify that the access transaction is valid. By allowing the page manager to 75 to create multiple isolated memory areas 71 and multiple non-isolated memory areas 83, the accessible physical memory 60 can more easily accommodate changes in system memory requirements.

The normal execution ring-0 11 including the primary OS 12, the software drivers 13, and the hardware drivers 14, can access both the OS pages 84 and the application pages 82. The normal execution ring-3, including applications 421 to 42N, can access only the application pages 82. Both the normal execution ring-0 11 and ring-3 41, however, cannot access the multiple isolated memory areas 71.

The isolated execution ring-0 15, including the OS nub 16 and the processor nub 18, can access both the multiple isolated memory areas 71, including the applet pages 72 and the OS nub pages 74, and the multiple non-isolated memory areas 83, including the application pages 82 and the OS pages 84. The isolated execution ring-3 45, including applets $46_1$ to $46_K$, can access only the application pages 82 and the applet pages 72. The applets $46_1$ to $46_K$ reside in the multiple isolated memory areas 71.

Figure 1D:
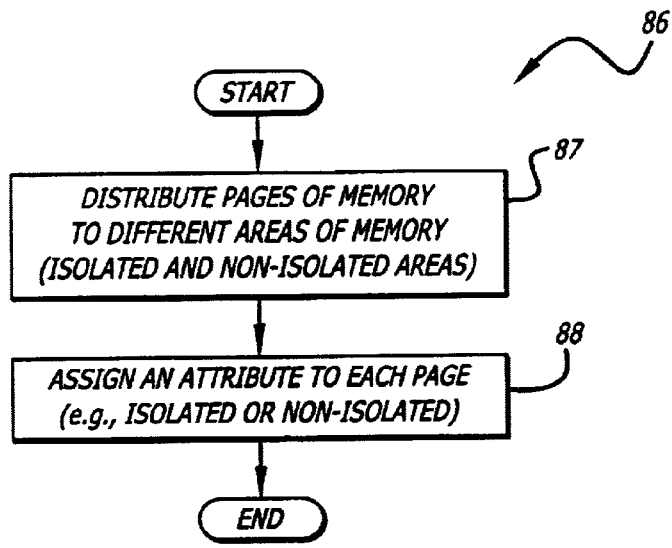
FIG. 1D is a flowchart illustrating a process to distribute pages of memory for isolated execution according to one embodiment of the invention.

FIG. 1D is a flowchart illustrating a process 86 to distribute pages of memory for isolated execution according to one embodiment of the invention.

Upon START, the process 86 distributes pages of memory to different areas of accessibly physical memory 60, respectively (block 87). The pages are distributed to both isolated areas 71 and non-isolated areas 83. In a preferred embodiment the size of the pages is fixed. For example, each page may be 4 MB or 4 KB. Next, the process 86 assigns an attribute to each page (block 88). The process 86 assigns an isolated attribute to a page if the page is distributed to an isolated area of memory, or, the process 86 assigns a non-isolated attribute to a page if the page is distributed to a non-isolated area of memory. The process 86 is then terminated.

FIG. 1E is a diagram illustrating the memory ownership page table 77 and a process of converting a virtual address to a physical address according to one embodiment of the invention. As previously discussed, the page manager 75 manages the memory ownership page table 77. The memory ownership page table 77 includes a plurality of page table entries 93. Each page table entry 93 includes the following components: the base of the page 95 and an attribute 96 (isolated or non-isolated) for the page. Only the page manager 75 can change the attribute 96 assigned to a page. Each page 98 includes a plurality of physical addresses 99. The page manager 75 flushes the memory ownership page table 77 or invalidates a page table entry 93 when the isolated and non-isolated memory areas change. The page manager 75 then reassigns and initializes the isolated and non-isolated memory areas.

A virtual address 212 includes a page table component 91 and an offset 92. The process of converting the virtual address 212 to a physical address 99 will be discussed later.

Figure 1F:
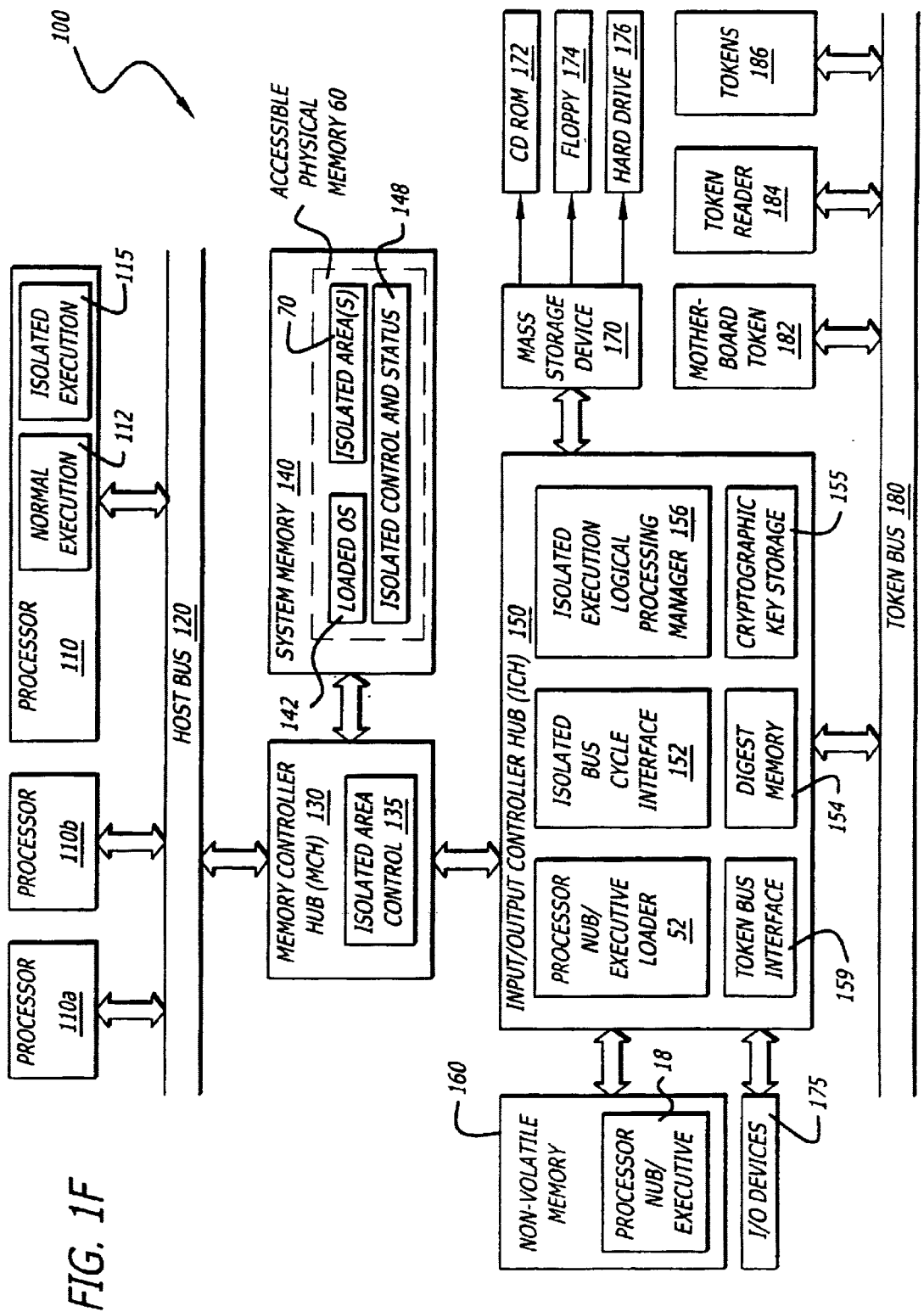
FIG. 1F is a diagram illustrating a computer system in which one embodiment of the invention can be practiced.

FIG. 1F is a diagram illustrating a computer system 100 in which one embodiment of the invention can be practiced. The computer system 100 includes a processor 110, a host bus 120, a memory controller hub (MCH) 130, a system memory 140, an input/output controller hub (ICH) 150, a non-volatile memory, or system flash, 160, a mass storage device 170, input/output devices 175, a token bus 180, a motherboard (MB) token 182, a reader 184, and a token 186.

The MCH 130 may be integrated into a chipset that integrates multiple functionalities such as the isolated execution mode, host-to-peripheral bus interface, memory control. Similarly, the ICH 150 may also be integrated into a chipset together or separate from the MCH 130 to perform I/O functions. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with an Intel Architecture (IA) processor, such as the Pentium™ series, the IA-32™ and the IA-64™. The processor 110 includes a normal execution mode 112 and an isolated execution circuit 115. The normal execution mode 112 is the mode in which the processor 110 operates in a non-protected environment, or a normal environment without the security features provided by the isolated execution mode. The isolated execution circuit 115 provides a mechanism to allow the processor 110 to operate in an isolated execution mode. The isolated execution circuit 115 provides hardware and software support for the isolated execution mode. This support includes configuration for isolated execution, definition of an isolated area or isolated areas, definition (e.g., decoding and execution) of isolated instructions, generation of isolated access bus cycles, and generation of isolated mode interrupts.

In one embodiment, the computer system 100 can be a single processor system, such as a desktop computer, which has only one main central processing unit, e.g. processor 110. In other embodiments, the computer system 100 can include multiple processors, e.g. processors 110, 110*a*, 110*b*, etc., as shown in FIG. 1D. Thus, the computer system 100 can be a multi-processor computer system having any number of processors. For example, the multi-processor computer system 100 can operate as part of a server or workstation environment. The basic description and operation of processor 110 will be discussed in detail below. It will be appreciated by those skilled in the art that the basic description and operation of processor 110 applies to the other processors 110*a* and 110*b*, shown in FIG. 1D, as well as any number of other processors that may be utilized in the multi-processor computer system 100 according to one embodiment of the present invention.

The processor 110 may also have multiple logical processors. A logical processor, sometimes referred to as a thread, is a functional unit within a physical processor having an architectural state and physical resources allocated according to some partitioning policy. Within the context of the present invention, the terms "thread" and "logical processor" are used to mean the same thing. A multi-threaded processor is a processor having multiple threads or multiple logical processors. A multi-processor system (e.g., the system comprising the processors 110, 110*a*, and 110*b*) may have multiple multi-threaded processors.

The host bus 120 provides interface signals to allow the processor 110 or processors 110, 110*a*, and 110*b* to communicate with other processors or devices, e.g., the MCH 130. In addition to normal mode, the host bus 120 provides an isolated access bus mode with corresponding interface signals for memory read and write cycles when the processor 110 is configured in the isolated execution mode. The isolated access bus mode is asserted on memory accesses initiated while the processor 110 is in the isolated execution mode. The isolated access bus mode is also asserted on instruction pre-fetch and cache write-back cycles if the address is within the isolated area address range and the processor 110 is initialized in the isolated execution mode. The processor 110 responds to snoop cycles to a cached address within the isolated area address range if the isolated access bus cycle is asserted and the processor 110 is initialized into the isolated execution mode.

The MCH 130 provides control and configuration of memory and input/output devices such as the system memory 140 and the ICH 150. The MCH 130 provides interface circuits to recognize and service isolated access assertions on memory reference bus cycles, including isolated memory read and write cycles. In addition, the MCH 130 has memory range registers (e.g., base and length registers) to represent the isolated area, or isolated areas, in the system memory 140. Once configured, the MCH 130 aborts any access to an isolated area that does not have the isolated access bus mode asserted.

The system memory 140 stores system code and data. The system memory 140 is typically implemented with dynamic random access memory (DRAM) or static random access memory (SRAM). The system memory 140 includes the accessible physical memory 60 (shown in FIGS. 1B and 1C). The accessible physical memory includes a loaded operating system 142, the isolated area 70 (FIG. 1B) or isolated areas 71 (FIG. 1C), and an isolated control and status space 148. The loaded operating system 142 is the portion of the operating system that is loaded into the system memory 140. The loaded OS 142 is typically loaded from a mass storage device via some boot code in a boot storage such as a boot read only memory (ROM). The isolated area 70 (FIG. 1B) or isolated areas 71 (FIG. 1C), is the memory area that is defined by the processor 110 when operating in the isolated execution mode. Access to the isolated area(s) is restricted and is enforced by the processor 110 and/or the MCH 130 or other chipset that integrates the isolated area functionalities. The isolated control and status space 148 is an input/output (I/O)-like, independent address space defined by the processor 110 and/or the MCH 130. The isolated control and status space 148 contains mainly the isolated execution control and status registers. The isolated control and status space 148 does not overlap any existing address space and is accessed using the isolated bus cycles. The system memory 140 may also include other programs or data which are not shown.

The ICH 150 represents a known single point in the system having the isolated execution functionality. For clarity, only one ICH 150 is shown. The system 100 may have many ICH's similar to the ICH 150. When there are multiple ICH's, a designated ICH is selected to control the isolated area configuration and status. In one embodiment, this selection is performed by an external strapping pin. As is known by one skilled in the art, other methods of selecting can be used, including using programmable configuring registers. The ICH 150 has a number of functionalities that are designed to support the isolated execution mode in addition to the traditional I/O functions. In particular, the ICH 150 includes an isolated bus cycle interface 152, the processor nub loader 52 (shown in FIG. 1A), a digest memory 154, a cryptographic key storage 155, an isolated execution logical processing manager 156, and a token bus interface 159.

The isolated bus cycle interface 152 includes circuitry to interface to the isolated bus cycle signals to recognize and service isolated bus cycles, such as the isolated read and write bus cycles. The processor nub loader 52, as shown in FIG. 1A, includes a processor nub loader code and its digest (e.g., hash) value. The processor nub loader 52 is invoked by execution of an appropriated isolated instruction (e.g., Iso-Init) and is transferred to the isolated area 70, or one of the isolated areas 71. From the isolated area, the processor nub loader 52 copies the processor nub 18 from the system flash (e.g., the processor nub code 18 in non-volatile memory 160) into the isolated area 70, verifies and logs its integrity, and manages a symmetric key used to protect the processor nub's secrets. In one embodiment, the processor nub loader 52 is implemented in read only memory (ROM). For security purposes, the processor nub loader 52 is unchanging, tamper-resistant and non-substitutable. The digest memory 154, typically implemented in RAM, stores the digest (e.g., hash) values of the loaded processor nub 18, the operating system nub 16, and any other critical modules (e.g., ring-0 modules) loaded into the isolated execution space.

The cryptographic key storage 155 holds a symmetric encryption/decryption key that is unique for the platform of the system 100. In one embodiment, the cryptographic key storage 155 includes internal fuses that are programmed at manufacturing. Alternatively, the cryptographic key storage 155 may also be created with a random number generator and a strap of a pin. The isolated execution logical processing manager 156 manages the operation of logical processors operating in isolated execution mode. In one embodiment, the isolated execution logical processing manager 156 includes a logical processor count register that tracks the number of logical processors participating in the isolated execution mode. The token bus interface 159 interfaces to the token bus 180. A combination of the processor nub loader digest, the processor nub digest, the operating system nub digest, and optionally additional digests, represents the overall isolated execution digest, referred to as isolated digest. The isolated digest is a fingerprint identifying the ring-0 code controlling the isolated execution configuration and operation. The isolated digest is used to attest or prove the state of the current isolated execution.

The non-volatile memory 160 stores non-volatile information. Typically, the non-volatile memory 160 is implemented in flash memory. The non-volatile memory 160 includes the processor nub 18.

The processor nub 18 provides the initial set-up and low-level management of the isolated area(s) (in the system memory 140), including verification, loading, and logging of the operating system nub 16, and the management of the symmetric key used to protect the operating system nub's secrets. The processor nub 18 may also provide application programming interface (API) abstractions to low-level security services provided by other hardware. The processor nub 18 may also be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$ to $42_N$), applets (e.g., applets $46_1$ to $46_K$) and operating systems. The mass storage device 170 may include compact disk (CD) ROM 172, floppy diskettes 174, and hard drive 176, and any other magnetic or optic storage devices. The mass storage device 170 provides a mechanism to read machine-readable media.

I/O devices 175 may include any 110 devices to perform 110 functions. Examples of I/O devices 175 include controller for input devices (e.g., keyboard, mouse, trackball, pointing device), media card (e.g., audio, video, graphics), network card, and any other peripheral controllers.

The token bus 180 provides an interface between the ICH 150 and various tokens in the system. A token is a device that performs dedicated input/output functions with security functionalities. A token has characteristics similar to a smart card, including at least one reserved-purpose public/private key pair and the ability to sign data with the private key. Examples of tokens connected to the token bus 180 include a motherboard token 182, a token reader 184, and other portable tokens 186 (e.g., smart card). The token bus interface 159 in the ICH 150 connects through the token bus 180 to the ICH 150 and ensures that when commanded to prove the state of the isolated execution, the corresponding token (e.g., the motherboard token 182, the token 186) signs only valid isolated digest information. For purposes of security, the token should be connected to the digest memory.

When implemented in software, the elements of the present invention are the code segments to perform the necessary tasks. The program or code segments can be stored in a machine readable medium, such as a processor readable medium, or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

CONTROLLING ACCESSES TO MULTIPLE ISOLATED MEMORIES IN AN ISOLATED EXECUTION ENVIRONMENT

Figure 2A:
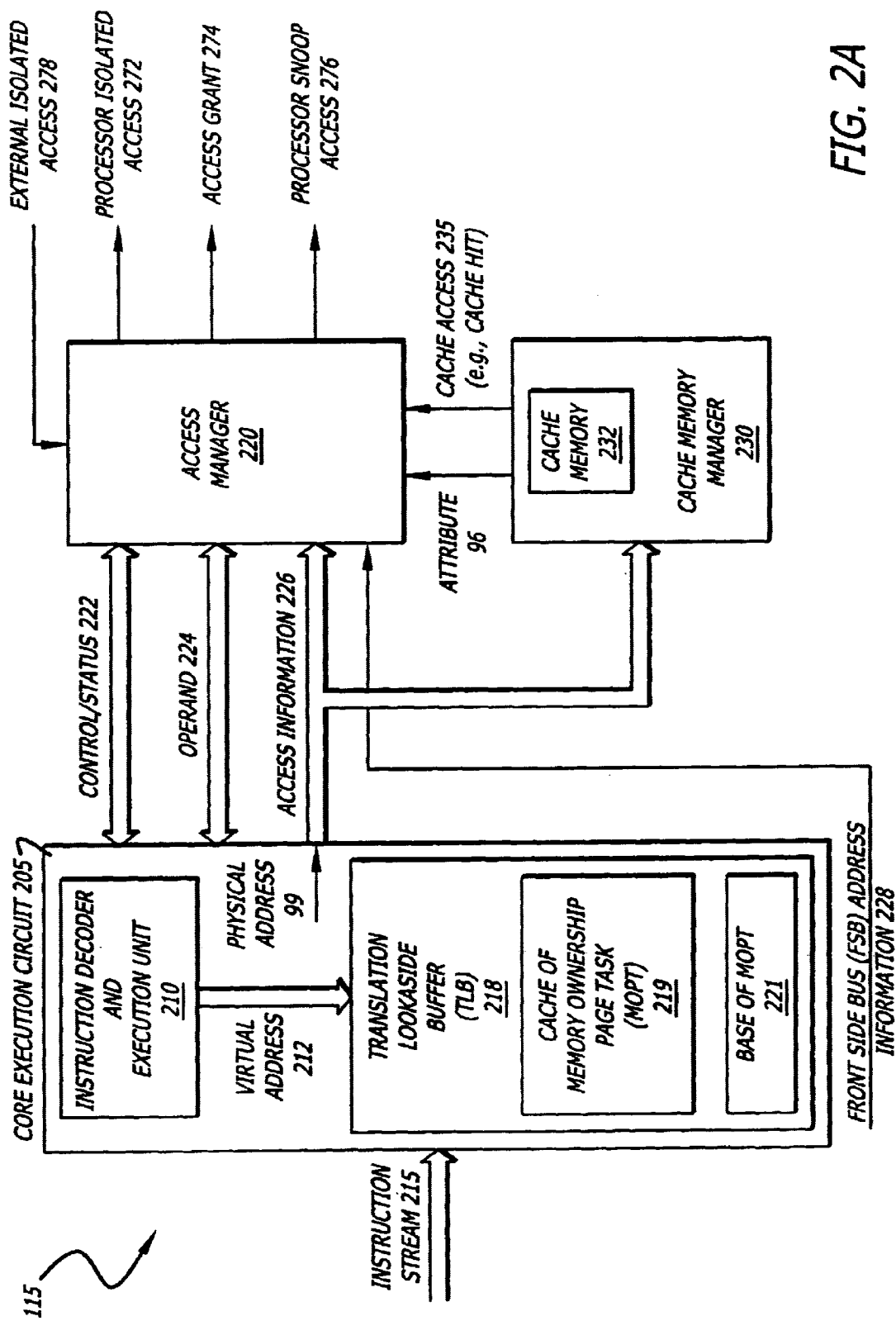
FIG. 2A is a diagram illustrating the isolated execution circuit shown in FIG. 1F according to one embodiment of the invention.

The present invention is a method, apparatus, and system to control memory accesses to multiple isolated memories 71, as shown in FIG. 1C, in an isolated execution environment. FIG. 2A is a diagram illustrating the isolated execution circuit 115 shown in FIG. 1F according to one embodiment of the invention. The isolated execution circuit 115 includes a core execution circuit 205, an access manager 220, and a cache memory manager 230.

The core execution unit 205 includes an instruction decoder and execution unit 210 and a translation lookaside buffer (TLB) 218. The instruction decoder and execution unit 210 receives an instruction stream 215 from an instruction fetch unit. The instruction stream 215 includes a number of instructions. The instruction decoder and execution unit 210 decodes the instructions and executes the decoded instructions. These instructions may be at the micro- or macro- level. The instruction decoder and execution unit 210 may be a physical circuit or an abstraction of a process of decoding and execution of instructions. In addition, the instructions may include isolated instructions and non-isolated instructions. The instruction decoder and execution unit 210 generates a virtual address 212 when there is an access transaction.

The TLB 218 translates the virtual address 212 into a physical address 99. The TLB 218 includes a cache 219 of the Memory Ownership Page Table (MOPT) 77. The TLB 218 first looks in the cache 219 to find the physical address that matches the virtual address 212 and an associated page table entry. If the physical address is not in the cache 219 the TLB 218 then searches the MOPT 77 itself. The TLB 218 uses the base of the MOPT 221 to search for the physical address. Referring also to FIG. 1E, starting with base of the MOPT 221 and the page table component 91 of the virtual address 212, the TLB 218 finds the page table entry 93 for the virtual address 212. As previously discussed, each page table entry 93 includes the base of the page 95 and an attribute 96 (isolated or non-isolated) for the page. Using the base of the page 95 and the offset component 92 of the virtual address the TLB 218 can find the physical address 99 corresponding to the virtual address. It should be appreciated that the translation of virtual addresses to physical addresses utilizing a TLB is well known in the art. As will be discussed later, the attribute 96 (isolated or non-isolated) for the page is important in configuring an access transaction for isolated execution.

Referring again to FIG. 2A, the core execution circuit 205 interfaces with the access manager 220 via control/status information 222, operand 224, and access information 226. The control/status information 222 includes control bits to manipulate various elements in the isolated bus cycle generator 220 and status data from the access manager 220. The operand 224 includes data to be written to and read from the access manager 220. The access information 226 includes address information (e.g., the physical address provided by the TLB 218), read/write, and access type information.

The access manager 220 receives and provides the control/status information 222, receives and provides operand 224 information, receives the access information 226 from the core execution circuit 205 as a result of instruction execution, receives a cache access signal 235 (e.g. a cache hit) and an attribute 96 (isolated or non-isolated) from the cache memory manager 230. The access manager 220 also receives an external isolated access signal 278 and a front side bus (FSB) address information signal 228 from another processor in the system. The external isolated access signal 278 is asserted when another processor in the system attempts to access one of the isolated memory areas. The access manager 220 generates an isolated access signal 272, an access grant signal 274, and a processor snoop access signal 276. The isolated access signal 272 may be used to generate an isolated bus cycle 230 sent to devices (e.g., chipsets) external to the processor 110 to indicate that the processor 110 is executing an isolated mode instruction. The processor snoop access signal 276 may be used by other devices or chipsets to determine if a snoop access is a hit or a miss. The isolated access signal 272, the access grant signal 274, and the processor snoop access signal 276 may also be used internally by the processor 110 to control and monitor other isolated or non-isolated activities.

The cache memory manager 230 receives the access information 226 from the core execution circuit 205 and generates the cache access signal 235 to the access manager 220. The cache memory manager 230 includes a cache memory 232 to store cache information and other circuits to manage cache transactions as known by one skilled in the art. The cache access signal 235 indicates the result of the cache access. In one embodiment, the cache access signal 235 is a cache hit signal that is asserted when there is a cache hit from a cache access.

Figure 2B:
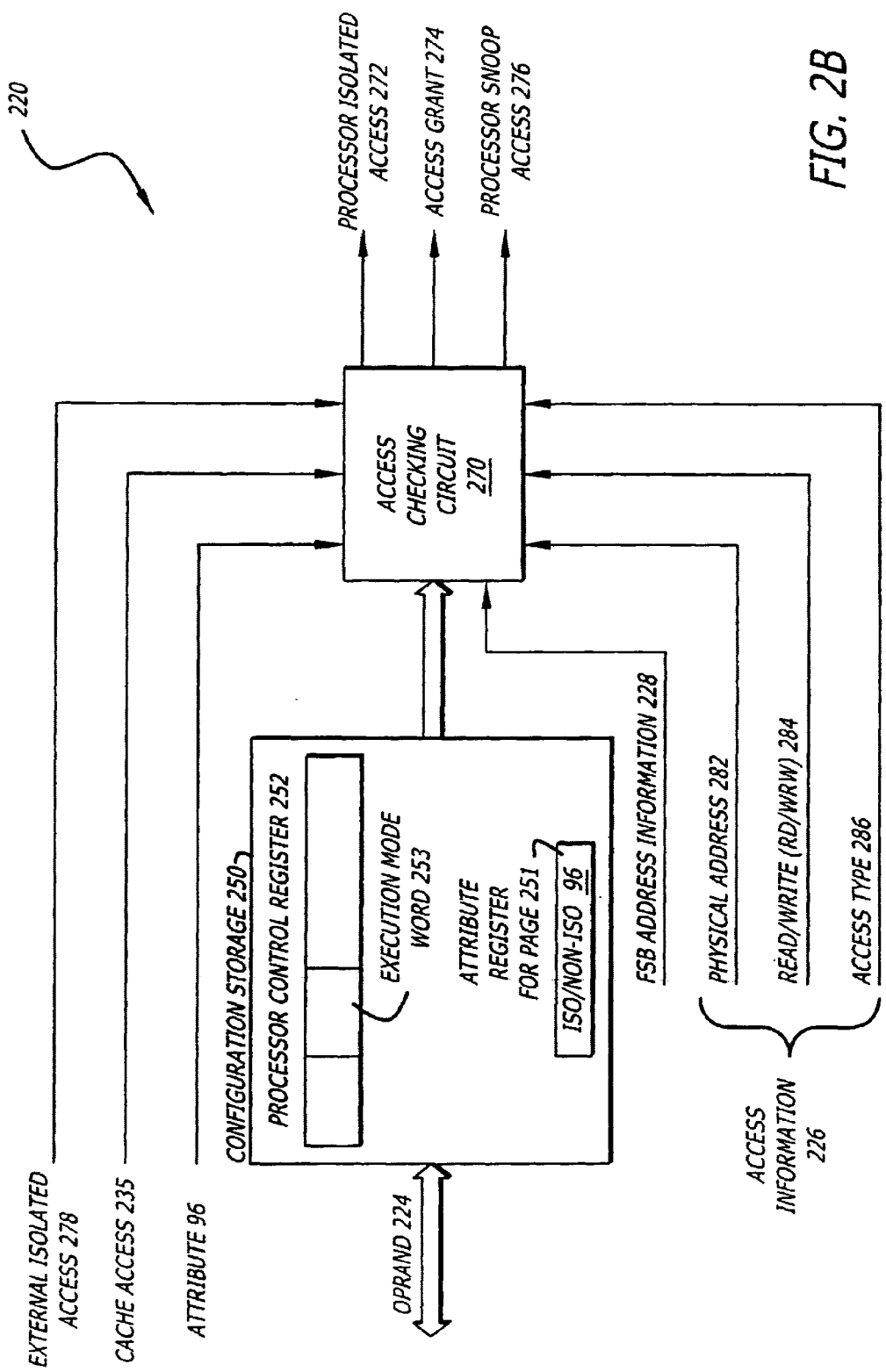
FIG. 2B is a diagram illustrating the access manager shown in FIG. 2A according to one embodiment of the invention.

FIG. 2B is a diagram illustrating the access manager shown in FIG. 2A according to one embodiment of the invention. The access manager 220 includes a configuration storage 250 and an access checking circuit 270. The access manager 220 exchanges operand 224 information with and receives the access information 226 from the core execution circuit 205 shown in FIG. 2A. The operand 224 information includes the attribute 96 (isolated or non-isolated) for the page associated with the physical address 99. The access manager 220 also receives the cache access signal 235 from the cache manager 230 and the external isolated access signal 278 and the FSB address information 228 from another processor as shown in FIG. 2A. The access manager 220 further receives an attribute 96 (isolated or non-isolated) from the cache manager 230. The attribute is on a per cache line basis. The access information 226 includes a physical address 99, a read/write (RD/WR#) signal 284 and an access type 286. The access information 226 is generated during an access transaction by the processor 110. The access type 286 indicates a type of access, including a memory reference, an input/output (I/O) reference, and a logical processor access. The logical processor access includes a logical processor entry to an isolated enabled state, and a logical processor withdrawal from an isolated enabled state.

The configuration storage 250 contains configuration parameters to configure an access transaction generated by the processor 110. The processor 110 has a normal execution mode and an isolated execution mode. The access transaction has access information. The configuration storage 250 receives the operand 224 information from the instruction decoder and execution unit 210 (FIG. 2A). The configuration storage 250 includes an attribute register for a page 251 and a processor control register 252. The attribute register 251 contains the attribute 96 for the page associated with the physical address set to either isolated or non-isolated. The processor control register 252 contains an execution mode word 253. The execution mode word 253 is asserted when the processor 110 is configured in the isolated execution mode. In one embodiment, the execution mode word 253 is a single bit indicating if the processor 110 is in the isolated execution mode.

The access checking circuit 270 checks the access transaction using at least one of the configuration parameters (e.g. the execution mode word 253 and the attribute 96) and the access information 226. The access checking circuit 270 generates the processor isolated access signal 272, the access grant signal 274, and the processor snoop access signal 276 using at least one of the parameters in the configuration storage 250, the access information 226 in a transaction generated by the processor 110, and the FSB address information 228. The FSB address information 228 is typically provided by another processor and is snooped on the FSB. The isolated access signal 272 is asserted when the processor 110 is configured in the isolated execution mode. The access grant signal 274 is used to indicate that an access has been granted. The processor snoop access signal 276 is used to determine if an access from another processor results in a hit or a miss.

Figure 3A:
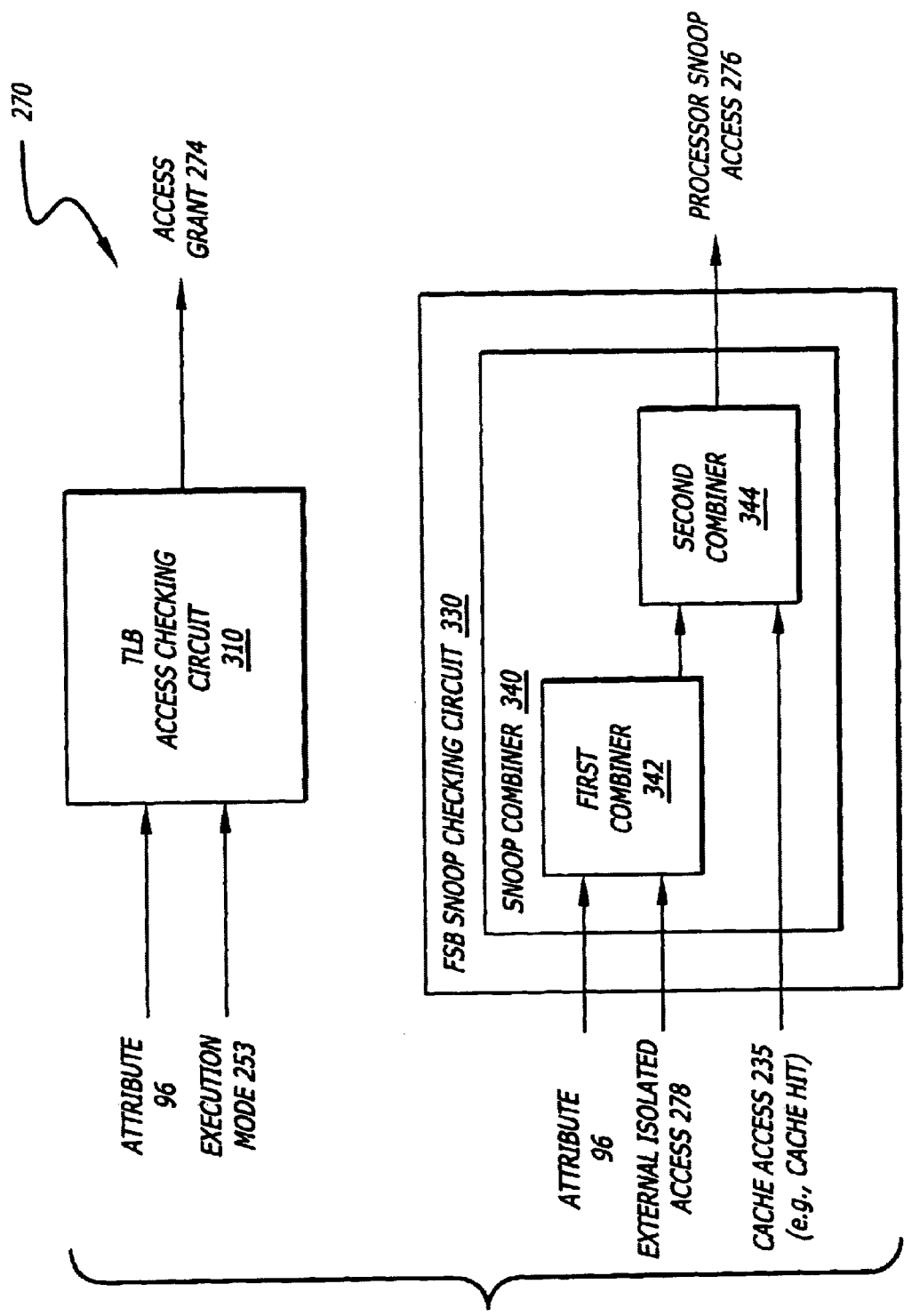
FIG. 3A is a diagram illustrating an access checking circuit according to one embodiment of the invention.

FIG. 3A is a diagram illustrating the access checking circuit 270 according to one embodiment of the invention. The access checking circuit 270 includes a TLB access checking circuit 310 and an FSB snoop checking circuit 330.

The TLB access checking circuit 310 receives the attribute 96 and the execution mode word 253 to generate an access grant signal 274. The access grant signal 274 to the isolated area is asserted when the attribute 96 is set to isolated and the execution mode word 253 is asserted indicating that an isolated access is valid or allowed as configured. In one embodiment, the TLB access checking circuit 310 performs a logical "Exclusive-Nor" operation. Thus, when a processor requests a physical address of an isolated area, only if the processor is operating in the isolated execution mode and the attribute for the page associated with the physical address is set to isolated, will the access transaction be granted.

The FSB snoop checking circuit 330 performs a similar function to the TLB access checking circuit 310. The FSB snoop checking circuit 330 generates the processor snoop access signal 276 by combining the cache access signal 235, the external isolated access signal 278, and the attribute 96. The FSB snoop checking circuit 330 includes a first combiner 342 and a second combiner 344. The first combiner 342 receives the attribute 96 (isolated or non-isolated) for the line to be snooped, from the cache memory manager 230, and the external isolated access signal 278 from another processor doing the snooping. The attribute is on a per cache line basis. In one embodiment, the first combiner 342 performs a logical "Exclusive-Nor" operation. The second combiner 344 combines the result of the first combiner 342 with the cache access signal 235 (e.g. cache hit). In one embodiment, the second combiner 344 performs a logical AND operation. Thus, a processor can only snoop out a line from another processor for an isolated area when the snooping processor is operating in the isolated execution mode, the attribute for the page is set to isolated, and there is a cache hit. Only when these conditions are satisfied will the access transaction be granted and the processor snoop access signal 276 be generated for an isolated area.

The FSB snoop checking circuit 330 ensures proper functionality in a multiprocessor system when not all the processors have been initialized for isolated memory area accesses. The X-NOR element 342 ensures that a snoop hit can only occur from a processor that has been allowed for isolated access. If one processor is not yet participating in the isolated memory area accesses, it will not be able to snoop a line out of another processor that is participating in the isolated memory area accesses. Similarly, a processor that has been enabled for isolated accesses will not inadvertently snoop a line out of another processor that has not yet been enabled.

The processor snoop access signal 276 for an isolated area is asserted indicating there is an access hit when the cache access signal 235 is asserted indicating there is a cache hit and when the external isolated access signal 278 is asserted and the attribute 96 is set to isolated.

Figure 3B:
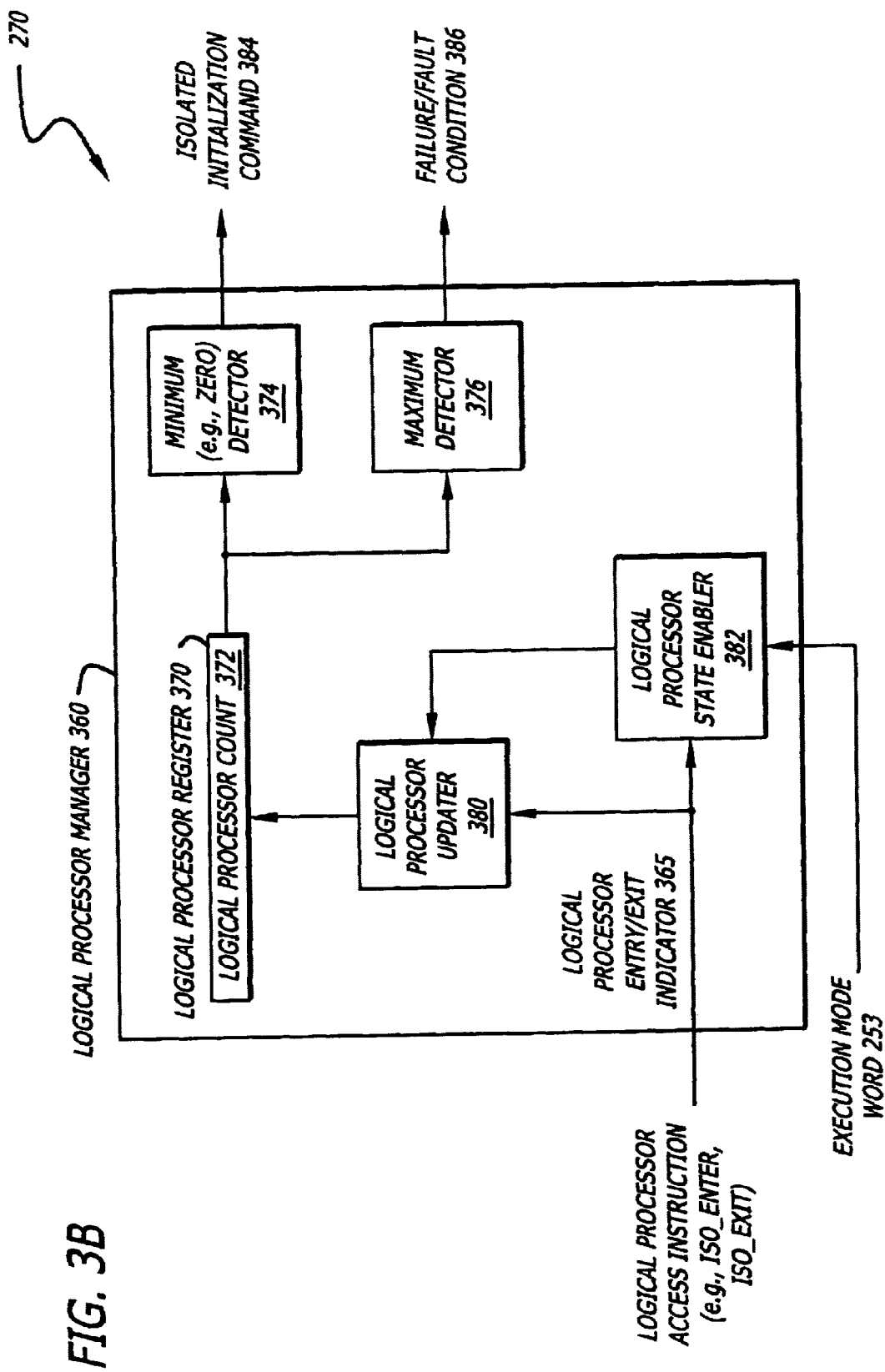
FIG. 3B is a diagram illustrating the access checking circuit to manage logical processor operations according to another embodiment of the invention.

FIG. 3B is a diagram illustrating the access checking circuit 270 to manage process logical processor operations according to another embodiment of the invention. The access checking circuit 270 includes a logical processor manager 360.

A physical processor may have a number of logical processors. Each logical processor may enter or exit a isolated processor state, referred to as a logical processor access. A logical processor access is typically generated when the corresponding logical processor executes an isolated instruction, such as isolated enter (iso_enter) and isolated_exit (iso_exit). The logical processor manager 360 manages a logical processor operation caused by the logical processor access. Essentially, the logical processor manager 360 keeps track of the number of enabled logical processors in the processor. The logical processor manager 360 includes a logical processor register 370, a logical processor state enabler 382, a logical processor updater 380, a minimum detector 374, and a maximum detector 376. The logical processor register 370 store a logical processor count 372 to indicate a number of logical processors currently enabled. The logical processor state enabler 382 enables a logical processor state when the logical processor access is valid. The logical processor updater 380 updates the logical processor count 372 according to the logical processor access. The logical processor updater 380 is enabled by the enabled logical processor state. In one embodiment, the logical processor register 370 and the logical processor updater 380 are implemented as an up/down counter with enable. The minimum detector 374 determines if the logical processor count 372 is equal to a minimum logical processor value (e.g., zero). The maximum detector 376 determines if the logical processor count 372 exceeds a maximum logical processor value. The maximum logical processor value is a number indicating the maximum number of logical processors that can be supported by the isolated execution mode in the processor 110.

The logical processor updater 380 initializes the logical processor register 370 at system reset. The logical processor updater 380 updates the logical processor count 372 in a first direction (e.g., incrementing) when the access transaction corresponds to the logical processor entry. The logical processor updater 380 updates the logical processor count 372 in a second direction opposite to the first direction (e.g., decrementing) when the access transaction corresponds to the logical processor exit or a logical processor withdrawal. When the logical processor count 372 is equal to the minimum logical processor value, the logical processor manager 360 causes the processor I 10 to clear the cache memory 232 (FIG. 2A) by writing it back to main memory and the isolated setting register (FIG. 2A) from all isolated information to restore the initial conditions in these storage elements. When the logical processor count 372 exceeds the maximum logical processor value, the logical processor manager 360 causes the processor 110 to generate a failure or fault condition because the total number of logical processors exceed the maximum number of logical processors that can be supported in the processor.

Figure 4:
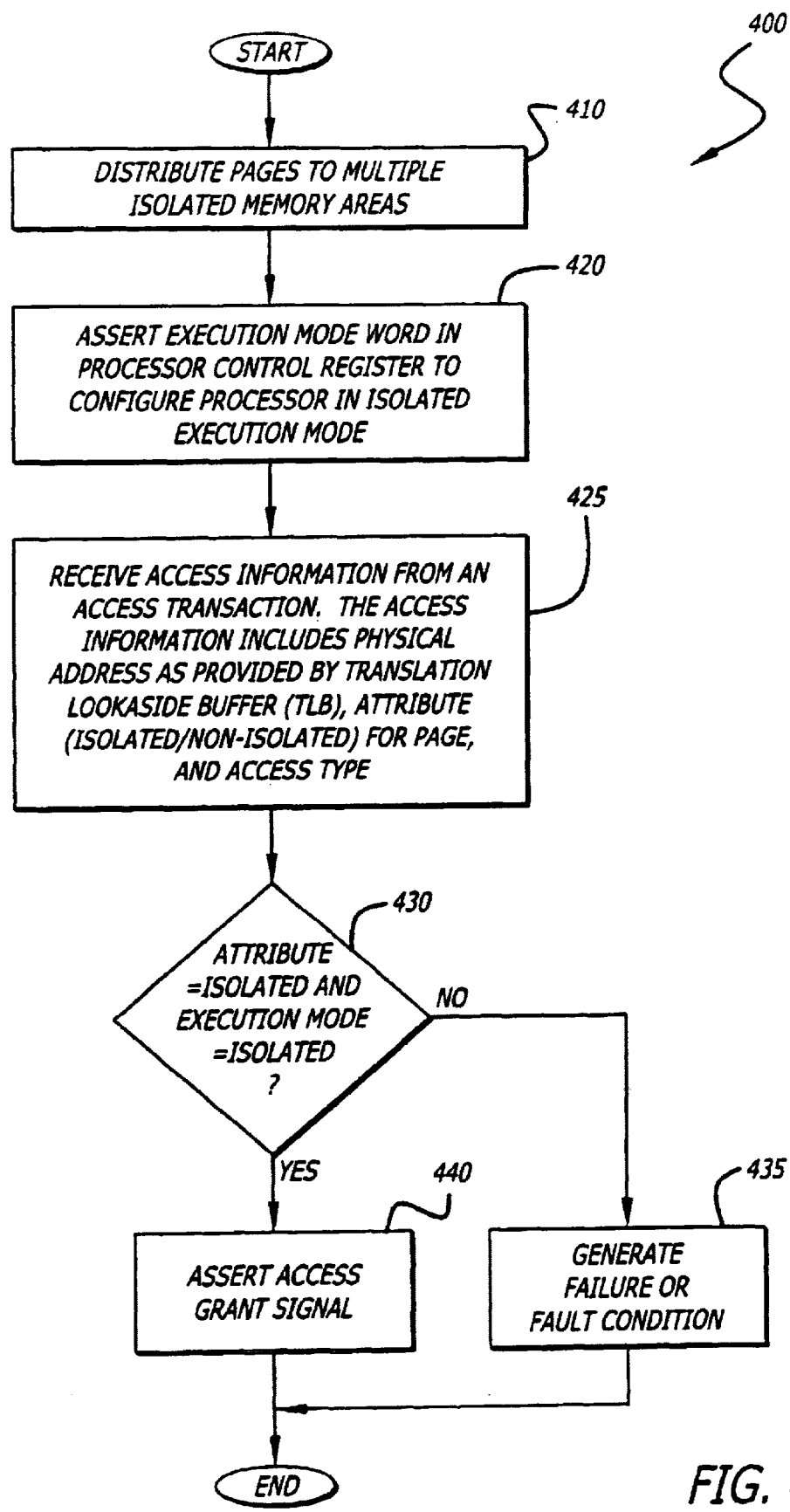
FIG. 4 is a flowchart illustrating a process to generate an access grant signal for isolated execution according to one embodiment of the invention.

FIG. 4 is a flowchart illustrating a process 400 to generate an access grant signal for isolated execution according to one embodiment of the invention.

Upon START, the process 400 distributes pages to multiple isolated memory areas (Block 410). Then, the process 400 asserts the execution mode word in the processor control register to configure the processor in the isolated execution mode (Block 420). The process 400 then receives access information from an access transaction from a processor (Block 425). The access information includes a physical address (as provided by the TLB), an attribute (isolated/non-isolated) for the page, and an access type. Next, the process 400 determines if the attribute is set to isolated and the execution mode word is asserted (indicating set to isolated) (Block 430). If not, the process 400 generates a failure or fault condition (Block 435) and is then terminated. Otherwise, the process 400 asserts the access grant signal (Block 440). Then the process 400 is terminated.

Figure 5:
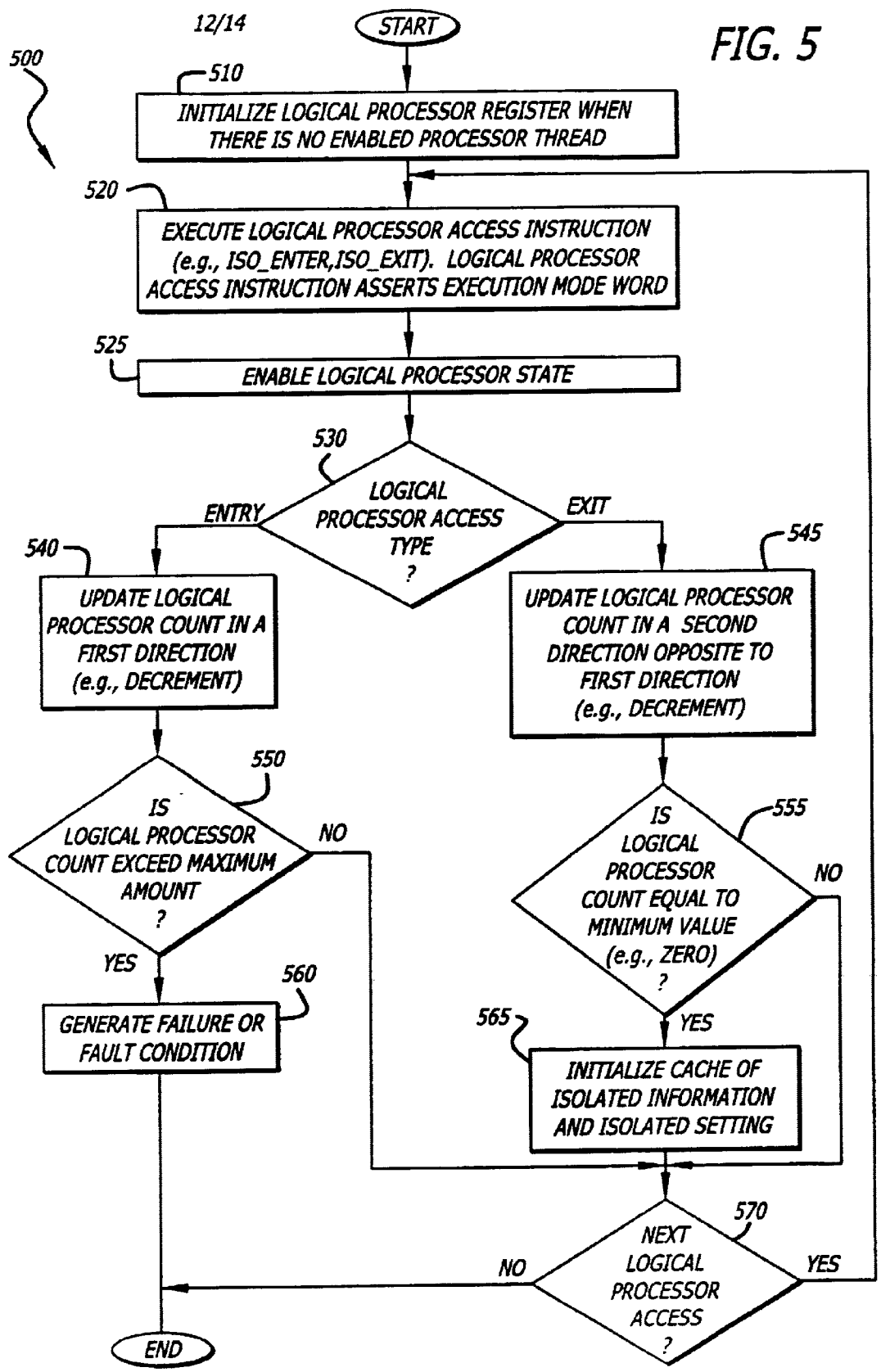
FIG. 5 is a flowchart illustrating a process to manage process thread operations for isolated execution according to one embodiment of the invention.

FIG. 5 is a flowchart illustrating a process 500 to manage process logical processor operations for isolated execution according to one embodiment of the invention.

Upon START, the process 500 initializes the logical processor register when there is no enabled logical processor (Block 510). Then the process 500 executes a logical processor access instruction (e.g., iso_enter, iso_exit). The logical processor access instruction asserts the execution mode word. Next, the process 500 enables the logical processor state (Block 525). Then, the process 500 determines the logical processor access type (Block 530).

If the logical processor access type is a logical processor entry, the process 500 updates the logical processor count in a first direction (e.g., incrementing) (Block 540). Then, the process 500 determines if the logical processor count exceeds the maximum logical processor value (Block 550). If not, the process 500 goes to block 570. Otherwise, the process 500 generates a failure or fault condition (Block 560) and is then terminated.

If the logical processor access type is a logical processor exit or logical processor withdrawal, the process 500 updates the logical processor count in a second direction opposite to the first direction (e.g., decrementing) (Block 545). Then, the process 500 determines if the logical processor count is equal to the minimum value (e.g., zero) (Block 555). If not, the process 500 goes to block 570. Otherwise, the process 500 initializes the cache memory and the isolated setting register from all the isolated information (Block 565).

Next, the process 500 determines if there is a next logical processor access (Block 570). If there is a next logical processor access, the process 500 returns to block 520 to execute a logical processor access instruction. If there is no more logical processor access, the process 500 is terminated.

CONTROLLING ACCESSES TO MULTIPLE ISOLATED MEMORIES USING A MEMORY CONTROLLER IN AN ISOLATED EXECUTION ENVIRONMENT

The above description refers to the isolated execution process in the processor 110. Accesses to the multiple isolated memory areas 71, shown in FIG. 1C, are further controlled by the MCH 130 (FIG. 1F). Referring to FIG. 1F, the processor 110 views the MCH 130 as an input/output device mapped into an address location. To have accesses to the isolated memory area 70, and particularly the multiple isolated memory areas 71 (FIG. 1C), the processor 110 needs to configure the memory configuration storage in the MCH 130 accordingly. The MCH 130 also includes control functions to allow the processor 110 to access the memory 140 in the multiple non-isolated memory areas 83 (FIG. 1C) as well. The MCH 130 receives signals from the processor 110 via the host bus 120, such as the isolated access signal, or the bus cycle information.

In FIG. 1F, the MCH 130 is shown external to the processor 110. However, it is possible for the MCH 130 to be included inside the processor 110. In this case, a write cycle to the registers in the MCH 130 is externalized to allow any external cache to participate for cache coherency.

In essence, the access controller in the MCH 130 performs a similar function as the access checking circuit 270 shown in FIG. 3A. By maintaining access consistency in both processor 110 and MCH 130, accessing memory can be tightly controlled. The access controller in the MCH 130 determines if an access transaction from the processor 110 is valid. If it is, the access controller returns an access grant signal to allow completion of the access transaction. Otherwise, a failure or fault condition is generated. In addition, the access controller in the MCH 130 also protects any intentional or accidental writing to its own configuration and control storage. Since the MCH 130 is directly interfaced to the memory 140, the access controller also provides for the initializing of the contents of the isolated memory areas and its own internal storage upon reset.

Figure 6:
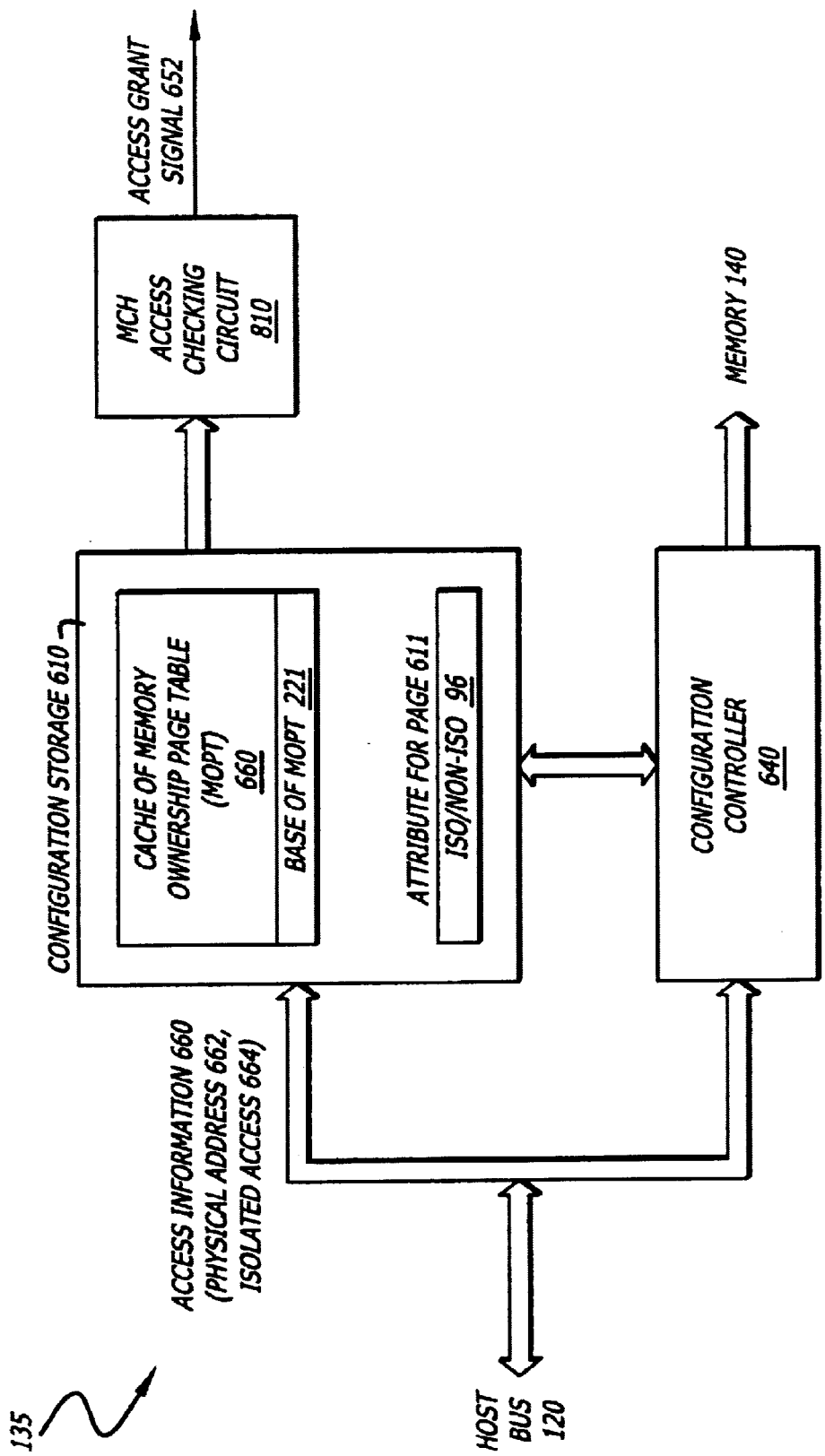
FIG. 6 is a diagram illustrating the isolated area access control in the memory controller hub (MCH) shown in FIG. 1F according to one embodiment of the invention.

FIG. 6 is a diagram illustrating the isolated area access controller 135 in the memory controller hub (MCH) 130 shown in FIG. 1F according to one embodiment of the invention. The access controller 135 includes a configuration storage 610, a configuration controller 640, and an MCH access checking circuit 810.

The configuration storage 610 configures an access transaction generated by the processor 110 shown in FIG. 1F. The processor 110 has a normal execution mode and an isolated execution mode. The access transaction has access information 660. The access information 660 is carried over the host bus 120 (FIG. 1F) and includes address information and an isolated access state. The address information is represented by a physical address 662. The isolated access state is represented by the isolated access signal 664. The isolated access signal 664 is essentially equivalent to the processor isolated access signal 272 shown in FIG. 2A. The isolated access signal 664 is asserted when the processor 110 generates a valid reference to one of the multiple isolated memory areas 71 (shown in FIG. 1C).

The configuration storage 610 includes a cache 660 of the Memory Ownership Page Table (MOPT) 77. The configuration storage 610 performs a look up for the physical address 662 in the cache 660 to find the physical address and an associated page table entry. If the physical address is not in the cache 219 the configuration storage 610 then performs a look up for the physical address 662 in the MOPT 77 (FIG. 1E) itself. The configuration storage 610 uses the base of the MOPT 221 to search for the physical address 662 in the MOPT 77. Referring also to FIG. 1E, starting with base of the MOPT 221 the configuration storage 610 performs a look up into the MOPT 77 and finds the page table entry 93 associated with the physical address 662. The configuration storage can search the physical addresses of the pages 98 to locate the page table entry 93 associated with the physical address. Each page table entry 93 includes an attribute 96 (isolated or non-isolated) for the page associated with the physical address that is important for configuring an access transaction for the MCH 130. It should be appreciated that the performing a look up into a page table to locate a physical address and an associated page table entry is well known in the art and that other methods of performing the look up are well within the knowledge of one skilled in the art.

The configuration storage 250 also contains configuration parameters to configure an access transaction generated by the MCH 130. The configuration storage includes an attribute register 611 that contains the attribute 96 for the page associated with the physical address set to either isolated or non-isolated found by the look up. As discussed earlier, the isolated memory area 71 is only accessible to the processor 110 in the isolated execution mode.

The configuration controller 640 controls access to the configuration storage 610 and provides some control functions to the memory 140.

The MCH access checking circuit 810 generates an access grant signal 652 using the access information 660, the attribute 96, the isolated access signal 664, and the isolated memory priority 736. The access grant signal 652 indicates if the access transaction is valid. The access grant signal 652 may be used by the processor 110 or other chipsets or peripheral devices to determine if an attempt to access the isolated memory area 71 is granted.

Figure 7:
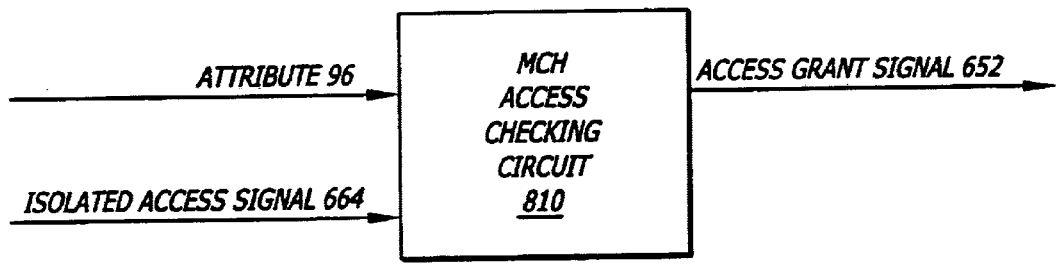
FIG. 7 is a diagram illustrating the MCH access checking circuit shown in FIG. 6 according to one embodiment of the invention.

FIG. 7 is a diagram illustrating the MCH access checking circuit 810 shown in FIG. 6 according to one embodiment of the invention.

The MCH access checking circuit 810 generates an access grant signal 652 based upon the attribute 96 and the isolated access signal 664. The access grant signal 652 indicates if the access transaction is valid. The MCH access checking circuit 810 receives the attribute 96 and the isolated access signal 664 to generate an access grant signal 652. The access grant signal 652 to the isolated area is asserted when the attribute 96 is set to isolated and the isolated access signal 664 is asserted indicating that an isolated access is valid or allowed as configured. In one embodiment, the MCH access checking circuit 810 performs a logical "Exclusive-Nor" operation. Thus, when a processor requests a physical address of an isolated area, only if the processor is operating in the isolated execution mode and the attribute for the page associated with the physical address is set to isolated, will the access transaction be granted.

Figure 8:
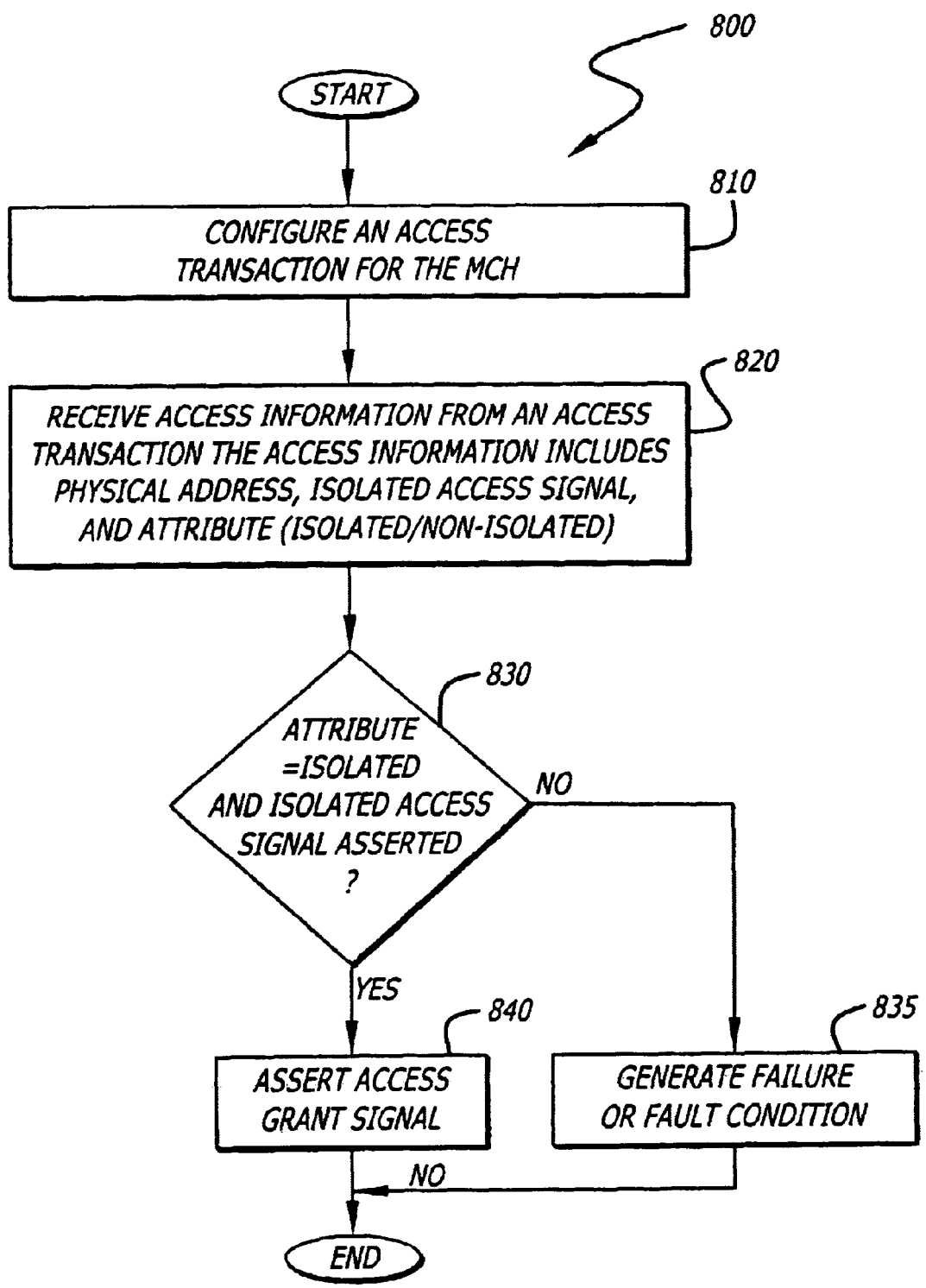
FIG. 8 is a flowchart illustrating a process to generate an access grant signal for isolated execution for an MCH according to one embodiment of the invention.

FIG. 8 is a flowchart illustrating a process 800 to generate an access grant signal for isolated execution for an MCH according to one embodiment of the invention.

Upon START, the process 800 configures an access transaction for the MCH (Block 810). Then, process 800 receives access information from an access transaction (Block 820). The access information includes a physical address, an isolated access signal, and an attribute (isolated/non-isolated) for the page. Next, the process 800 determines if the attribute is set to isolated and if the isolated access signal is asserted (Block 830). If not, the process 800 generates a failure or fault condition (Block 835) and is then terminated. Otherwise, the process 800 asserts the access grant signal (Block 840). Then the process 800 is terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
  a page manager distributing a plurality of pages to a plurality of different areas of a memory, respectively, the memory divided into non-isolated areas and isolated areas, the page manager located in an isolated area of memory; and
  a memory ownership page table located in an isolated area of memory, the memory ownership page table describing each page of memory.

2. The apparatus of claim 1 wherein the page manager assigns an isolated attribute to a page if the page is distributed to an isolated area of memory.

3. The apparatus of claim 2, wherein the page manager assigns a non-isolated attribute to the page if the page is distributed to a non-isolated area of memory, the memory ownership page table recording the attribute for each page.

4. The apparatus of claim 3 further comprising:
  a configuration storage containing configuration settings to configure an access transaction generated by a processor having a normal execution mode and an isolated execution mode, the access transaction having access information; and
  an access checking circuit coupled to the configuration storage to check the access transaction using at least one of the configuration settings and the access information.

5. The apparatus of claim 4 wherein the configuration settings include the attribute for a page and an execution mode word.

6. The apparatus of claim 5 wherein the access information comprises a physical address and an access type, the access type indicating if the access transaction is one of a memory access, an input/output access, and a logical processor access.

7. The apparatus of claim 5 wherein the configuration storage further comprises an attribute storage to contain the attribute for a page defining the page as isolated or non-isolated.

8. The apparatus of claim 5 wherein the configuration storage further comprises a processor control register to contain the execution mode word, the execution mode word being asserted when the processor is configured in the isolated execution mode.

9. The apparatus of claim 5 wherein the access checking circuit comprises a TLB access checking circuit to detect if the attribute for the page is set to isolated and the execution mode word is asserted, the TLB access checking circuit generating an access grant signal.

10. The apparatus of claim 5 wherein the access checking circuit comprises an FSB snoop checking circuit coupled to a cache, the FSB snoop checking circuit combining the attribute, an external isolated access signal from another processor, and a cache access signal, the FSB snoop checking circuit generating a processor snoop access signal.

11. A method comprising:
  distributing a plurality of pages to a plurality of different areas of a memory, respectively, utilizing a page manager, the memory divided into non-isolated areas and isolated areas, the page manager located in an isolated area of memory; and describing each page of memory.

12. The method of claim 11 wherein describing each page of memory comprises assigning an isolated attribute to a page if the page is distributed to an isolated area of memory.

13. The method of claim 12 wherein describing each page of memory further comprises:
  assigning a non-isolated attribute to the page if the page is distributed to a non-isolated area of memory; and recording the attribute for each page in a memory ownership page table.

14. The method of claim 13 further comprising configuring an access transaction generated by a processor having a configuration storage containing configuration settings, the processor having a normal execution mode and an isolated execution mode, the access transaction having access information; and
  checking the access transaction by an access checking circuit using at least one of the configuration settings and the access information.

15. The method of claim 14 wherein the configuration settings include the attribute for a page and an execution mode word.

16. The method of claim 15 wherein the access information comprises a physical address and an access type, the access type indicating if the access transaction is one of a memory access, an input/output access, and a logical processor access.

17. The method of claim 15 wherein configuring the access transaction further comprises:
  setting the attribute for the page as isolated or non-isolated; and
  storing the attribute in an attribute storage within the configuration storage.

18. The method of claim 15 wherein configuring the access transaction further comprises asserting the execution mode word stored in a processor control register when the processor is configured in the isolated execution mode.

19. The method of claim 15 wherein checking the access transaction comprises:
  detecting if the attribute for the page is set to isolated;
  detecting if the execution mode word is asserted; and
  generating an access grant signal.

20. The method of claim 15 wherein checking the access transaction comprises:
  combining the attribute, an external isolated access signal from another processor, and a cache access signal; and
  generating a processor snoop access signal.

21. A computer program product comprising:
  a machine readable medium having computer program code embodied therein, the computer program product comprising:
  computer readable program code for distributing a plurality of pages to a plurality of different areas of a memory, respectively, utilizing a page manager, the memory divided into non-isolated areas and isolated areas, the page manager located in an isolated area of memory; and
  computer readable program code for describing each page of memory.

22. The computer program product of claim 21 wherein the computer readable program code for describing each page of memory comprises computer readable program code for assigning an isolated attribute to a page if the page is distributed to an isolated area of memory.

23. The computer program product of claim 22 wherein the computer readable program code for describing each page of memory further comprises:
  computer readable program code for assigning a non-isolated attribute to the page if the page is distributed to a non-isolated area of memory; and
  computer readable program code for recording the attribute for each page in a memory ownership page table.

24. The computer program product of claim 23 further comprising:
  computer readable program code for configuring an access transaction generated by a processor having a configuration storage containing configuration settings, the processor having a normal execution mode and an isolated execution mode, the access transaction having access information; and
  computer readable program code for checking the access transaction by an access checking circuit using at least one of the configuration settings and the access information.

25. The computer program product of claim 24 wherein the configuration settings include the attribute for a page and an execution mode word.

26. The computer program product of claim 25 wherein the access information comprises a physical address and an access type, the access type indicating if the access transaction is one of a memory access, an input/output access, and a logical processor access.

27. The computer program product of claim 25 wherein the computer readable program code for configuring the access transaction further comprises:
  computer readable program code for setting the attribute for the page as isolated or non-isolated; and
  computer readable program code for storing the attribute in an attribute storage within the configuration storage.

28. The computer program product of claim 25 wherein the computer readable program code for configuring the access transaction further comprises computer readable program code for asserting the execution mode word stored in a processor control register when the processor is configured in the isolated execution mode.

29. The computer program product of claim 25 wherein the computer readable program code for checking the access transaction comprises:
  computer readable program code for detecting if the attribute for the page is set to isolated;
  computer readable program code for detecting if the execution mode word is asserted; and
  computer readable program code for generating an access grant signal.

30. The computer program product of claim 25 wherein the computer readable program code for checking the access transaction comprises:
  computer readable program code for combining the attribute, an external isolated access signal from another processor, and a cache access signal; and
  computer readable program code for generating a processor snoop access signal.

31. A system comprising:
  a chipset;
  a memory coupled to the chipset;
  a processor coupled to the chipset and the memory, the processor having a normal execution mode and an isolated execution mode;
  a page manager operating under the control of the processor, the page manager distributing a plurality of pages to a plurality of different areas of the memory, respectively, the memory divided into non-isolated areas and isolated areas, the page manager located in an isolated area of memory; and
  a memory ownership page table located in an isolated area of memory, the memory ownership page table describing each page of memory.

32. The system of claim 31 wherein the page manager assigns an isolated attribute to a page if the page is distributed to an isolated area of memory.

33. The system of claim 32 wherein the page manager assigns a non-isolated attribute to the page if the page is distributed to a non-isolated area of memory, the memory ownership page table recording the attribute for each page.

34. The system of claim 33 further comprising:
  a configuration storage containing configuration settings to configure an access transaction generated by a processor having a normal execution mode and an isolated execution mode, the access transaction having access information; and
  an access checking circuit coupled to the configuration storage to check the access transaction using at least one of the configuration settings and the access information.

35. The system of claim 34 wherein the configuration settings include the attribute for a page and an execution mode word.

36. The system of claim 35 wherein the access information comprises a physical address and an access type, the access type indicating if the access transaction is one of a memory access, an input/output access, and a logical processor access.

37. The system of claim 35 wherein the configuration storage further comprises an attribute storage to contain the attribute for a page defining the page as isolated or non-isolated.

38. The system of claim 35 wherein the configuration storage further comprises a processor control register to contain the execution mode word, the execution mode word being asserted when the processor is configured in the isolated execution mode.

39. The system of claim 35 wherein the access checking circuit comprises a TLB access checking circuit to detect if the attribute for the page is set to isolated and the execution mode word is asserted, the TLB access checking circuit generating an access grant signal.

40. The system of claim 35 wherein the access checking circuit further comprises an FSB snoop checking circuit coupled to a cache, the FSB snoop checking circuit combining the attribute, an external isolated access signal from another processor, and a cache access signal, the FSB snoop checking circuit generating a processor snoop access signal.

* * * * *